United States Patent
Francois et al.

(10) Patent No.: US 12,549,747 B2
(45) Date of Patent: Feb. 10, 2026

(54) SPATIAL RESOLUTION ADAPTATION OF IN-LOOP AND POST-FILTERING OF COMPRESSED VIDEO USING METADATA

(71) Applicant: InterDigital CE Patent Holdings, SAS, Paris (FR)

(72) Inventors: Edouard Francois, Bourg des Comptes (FR); Christel Chamaret, Chantepie (FR); Erik Reinhard, Hédé-Bazouges (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 50 days.

(21) Appl. No.: 18/030,648

(22) PCT Filed: Sep. 29, 2021

(86) PCT No.: PCT/EP2021/076733
§ 371 (c)(1),
(2) Date: Apr. 6, 2023

(87) PCT Pub. No.: WO2022/073811
PCT Pub. Date: Apr. 14, 2022

(65) Prior Publication Data
US 2023/0379482 A1 Nov. 23, 2023

(30) Foreign Application Priority Data
Oct. 6, 2020 (EP) .................................... 20306158

(51) Int. Cl.
*H04N 19/33* (2014.01)
*H04N 19/117* (2014.01)
(Continued)

(52) U.S. Cl.
CPC .......... *H04N 19/33* (2014.11); *H04N 19/117* (2014.11); *H04N 19/136* (2014.11); *H04N 19/172* (2014.11); *H04N 19/70* (2014.11)

(58) Field of Classification Search
None
See application file for complete search history.

(56) References Cited

U.S. PATENT DOCUMENTS

| 2012/0230393 A1* | 9/2012 | Naing ................. H04N 19/117 375/E7.125 |
| 2013/0163660 A1* | 6/2013 | Boyce ................... H04N 19/46 375/240.02 |

(Continued)

FOREIGN PATENT DOCUMENTS

| WO | WO 2013006310 A1 | 1/2013 |
| WO | WO 2019089695 A1 | 5/2019 |

(Continued)

OTHER PUBLICATIONS

Bross et al., "High Efficiency Video Coding (HEVC) Text Specification Draft 10 (for FDIS and Last Call)", Joint Collaborative Team on Video Coding (JCT-VC) of ITU-T SG 16 WP3 and ISO/IEC JTC 1/SC 29/WG 11, Document No. JCTVC-L1003_v34, 12th Meeting, Geneva, Switzerland, Jan. 14, 2013, 310 pages.

(Continued)

*Primary Examiner* — Samuel D Fereja
(74) *Attorney, Agent, or Firm* — Condo Roccia Koptiw LLP

(57) ABSTRACT

A method for video decoding pictures comprising: reconstructing (701) a picture at a first spatial resolution; and, obtaining (702) metadata associated to said picture representative of an information specifying that applying at least one in-loop filtering and/or at least one post-filtering on at least a portion of said reconstructed picture at a second spatial resolution different from the first resolution is allowed.

20 Claims, 9 Drawing Sheets

(51) Int. Cl.
H04N 19/136 (2014.01)
H04N 19/172 (2014.01)
H04N 19/70 (2014.01)

(56) References Cited

U.S. PATENT DOCUMENTS

| | | | |
|---|---|---|---|
| 2021/0084318 A1* | 3/2021 | Kuo | H04N 19/186 |
| 2021/0235078 A1* | 7/2021 | Hu | H04N 19/176 |
| 2021/0409873 A1 | 12/2021 | Jiang et al. | |
| 2022/0021905 A1 | 1/2022 | Ma et al. | |
| 2023/0076920 A1* | 3/2023 | Chen | H04N 19/50 |

FOREIGN PATENT DOCUMENTS

| | | |
|---|---|---|
| WO | 2020177133 A1 | 9/2020 |
| WO | 2020192020 A1 | 10/2020 |

OTHER PUBLICATIONS

Bross et al., "Versatile Video Coding (Draft 10)", Joint Video Experts Team (JVET) of ITU-T SG 16 WP3 and ISO/IEC JTC 1/SC 29/WG 11, Document JVET-S2001_vB, 19th meeting, Teleconference, Jun. 22, 2020, 547 pages.
Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.266, Aug. 2020, 516 pages.
Anonymous, "Information Technology—High efficiency Coding and Media Delivery in Heterogeneous Environments—Part 2: High Efficiency Video Coding", International Organization for Standardization, ISO/IEC JTC 1/SC 29/WG 11, ISO/IEC DIS 23008-2:201x(E), 4th Edition, Apr. 20, 2018, 874 pages.
Anonymous, "Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.
Hendry et al., "AHG 19: Adaptive resolution change (ARC) support in VVC", Joint Video Experts Team (JVET) of ITU-T SG 16 WP3 and ISO/IEC JTC 1/SC 29/WG 11, Document: JVET-N0118-v1, 14th Meeting, Geneva, Switzerland, Mar. 19, 2019, 8 pages.
Rivaz et al., "AV1 Bitstream & Decoding Process Specification", The Alliance for Open Media, AOMedia, Version 1.0.0 with Errata 1, Jan. 8, 2019, 681 pages.
Anonymous, "Information technology—Coding of audio-visual objects—Part 10: Advanced Video Coding", International Organization for Standardization (ISO), International Standard ISO/IEC 14496-10, Second Edition, Oct. 1, 2004, 280 pages.
Rivaz et al., "AV1 Bitstream & Decoding Process Specification", The Alliance for Open Media, AOMedia, Version 1.0.0, Jun. 25, 2018, 677 pages.

* cited by examiner

SPATIAL RESOLUTION ADAPTATION OF IN-LOOP AND POST-FILTERING OF COMPRESSED VIDEO USING METADATA

CROSS REFERENCE TO RELATED APPLICATIONS

This application is a U.S. National Stage Application under 35 U.S.C. § 371 of International Patent Application No. PCT/EP2021/076733, filed Sep. 29, 2021, which is incorporated herein by reference.

This application claims priority to European Application No. 20306158.5, filed Oct. 6, 2020, which is incorporated herein by reference in its entirety.

1. TECHNICAL FIELD

At least one of the present embodiments generally relates to a method and an apparatus for controlling at which resolution in-loop filtering and out of loop post-filtering is performed in a video encoding and decoding application.

2. BACKGROUND

To achieve high compression efficiency, video coding schemes usually employ predictions and transforms to leverage spatial and temporal redundancies in a video content. During an encoding, images of the video content are divided into blocks of samples (i.e. Pixels), these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

Last generations of video compression standards, such as MPEG-4/AVC (ISO/CEI 14496-10), HEVC (ISO/IEC 23008-2—MPEG-H Part 2, High Efficiency Video Coding/ITU-T H.265)) or the international standard entitled Versatile Video Coding (VVC) under development by a joint collaborative team of ITU-T and ISO/IEC experts known as the Joint Video Experts Team (JVET) all comprise in loop filtering tools and favor the use of post-filtering through the definition of adapted metadata. The in-loop filtering tools comprise deblocking filtering (DBF), sample adaptive offset (SAO) and adaptive loop filters (ALF). For instance, ALF parameters are conveyed by Adaptation Parameter Set (APS) in VVC. Supplemental enhanced information (SEI) messages are used to convey some post-filtering parameters. The filters whose parameters are signaled in these metadata containers are generally designed to be applied at a specific spatial resolution. However, the spatial resolution at which they are actually applied is not necessarily the one for which they were designed. For instance, in case of down-sampling of the content in streaming application for adapting to the network constraints, the decoded video may be at a reduced resolution that may not be the resolution of the original video before the resolution adaptation process, or of target the display rendering resolution A tool, called Reference Picture Resampling (RPR), allows changing the resolution of coded pictures on the fly. The pictures are stored in a buffer of decoded pictures, generally called decoded picture buffer (DPB), at their actual coded/decoded resolution, which may be lower that the video spatial resolution signaled in high-level syntax (HLS) of the bitstream. When a picture being coded at a given resolution uses for temporal or inter-layer prediction a reference picture that is not at the same resolution, a reference picture resampling of the texture is applied so that the predicted picture and the reference picture have the same resolution. Note that depending on the implementation, the resampling process is not necessarily applied to the entire reference picture (entire reference picture resampling) but can be applied only to blocks identified as reference blocks when performing the decoding and reconstruction of the current picture (block-based reference picture resampling). In this case, when a current block in the current picture uses a reference picture that has a different resolution than the current picture, the samples in the reference picture that are used for the temporal prediction of the current block are resampled according to resampling ratios computed as ratios between the current picture resolution and the reference picture resolution. In the following of the document, the implementation used for describing the invention correspond to the solution of entire reference picture resampling, but the invention can be naturally extended to the solution of block-based reference picture resampling.

In some implementations, the steps of RPR and motion compensation are combined in one single sample interpolation step.

FIG. 1 represents an application of the RPR tool. In FIG. 1, picture 4 is temporally predicted from picture 3. Picture 3 is temporally predicted from picture 2. Picture 2 is temporally predicted from picture 1. Since picture 4 and picture 3 have different resolutions, picture 3 is up-sampled to picture 4 resolution. Picture 3 and 2 have the same resolution. No up-sampling nor down-sampling is applied to picture 2 for the temporal prediction. Picture 1 is larger than picture 2. A down-sampling is applied to picture 1 for the temporal prediction of picture 2. In any case, all pictures are up-sampled or down-sampled at the same resolution for display.

An issue of this design in case of use of RPR is that the in-loop filtering(s) and post-filtering(s) may be applied at an unsuitable resolution, different from the display or rendering resolution or from the resolution used for temporal prediction. This may result in a potential loss of quality. For example, when a picture is up-sampled for temporal prediction and/or display, said image has been in-loop filtered and post-filtered at an initial resolution and is then up-sampled. Applying an up-sampling on an in-loop filtered or post filtered picture may reduce the benefits provided by the in-loop filtering and post-filtering. Indeed, an up-sampling has a blurring effect on objects edges while, for example, the SAO edge offset attempts to enhance edges that have been affected by the quantization. Edges would have been better preserved if SAO edge offset had been applied after up-sampling. A similar issue can be illustrated for a post-filtering consisting in adding a noise to the decoding picture representative of the picture film grain, in order for instance to mask coding artefacts. The film grain is typically based on a noise model, with associated parameters. If the parameters are computed for a reduced resolution, the artefacts masking benefit of the synthetized film grain that is added to the decoded picture at the decoded resolution may not be as good as if it was derived and added for the display or rendering resolution.

It is desirable to propose solutions allowing to overcome the above issues. In particular, it is desirable to better define at which resolution in-loop and post filtering should be applied.

3. BRIEF SUMMARY

In a first aspect, one or more of the present embodiments provide a method for video encoding pictures comprising:
reconstructing a picture at a first spatial resolution; and,
associating to said picture metadata representative of an information specifying that applying at least one in-loop filtering and/or at least one post-filtering on at least a part of said reconstructed picture at a second spatial resolution different from the first resolution is allowed.

In a second aspect, one or more of the present embodiments provide a method for video decoding pictures comprising:
reconstructing a picture at a first spatial resolution; and,
obtaining metadata associated to said picture representative of an information specifying that applying at least one in-loop filtering and/or at least one post filtering on at least a part of said reconstructed picture at a second spatial resolution different from the first resolution is allowed.

In a third aspect, one or more of the present embodiments provide a device for video encoding pictures comprising electronic circuitry adapted for:
reconstructing a picture at a first spatial resolution; and,
associating to said picture metadata representative of an information specifying that applying at least one in-loop filtering and/or at least one post filtering on at least a part of said reconstructed picture at a second spatial resolution different from the first resolution is allowed.

In a fourth aspect, one or more of the present embodiments provide a device for video decoding pictures comprising electronic circuitry adapted for:
reconstructing a picture at a first spatial resolution; and,
obtaining metadata associated to said picture representative of an information specifying that applying at least one in-loop filtering and/or at least one post filtering on at least a part of said reconstructed picture at a second spatial resolution different from the first resolution is allowed.

In a fifth aspect, one or more of the present embodiments provide an apparatus comprising a device according to the third and the fourth aspect.

In a sixth aspect, one or more of the present embodiments provide a signal comprising data generated according to the method according to the first aspect or by the device according to the third aspect or by the apparatus according to the fifth aspect.

In a seventh aspect, one or more of the present embodiments provide a computer program comprising program code instructions for implementing the method according to first aspect or for implementing the method according to the second aspect.

In a eighth aspect, one or more of the present embodiments provide an information storage medium storing program code instructions for implementing the method according to first aspect or for implementing the method according to the second aspect.

In an embodiment, the metadata specify at least one spatial resolution at which an application of the least one in-loop filtering and/or at least one post-filtering on said reconstructed picture is recommended.

In an embodiment, the metadata specify at least one spatial resolution range at which an application of the least one in-loop filtering and/or at least one post-filtering on said reconstructed picture is recommended.

In an embodiment, when the metadata specify a plurality of spatial resolutions or spatial resolution ranges, the metadata further specify an in-loop filter and/or post-filter corresponding to each spatial resolution or each resolution range.

In an embodiment, the metadata further specify for each specified spatial resolution or spatial resolution range information representative of a quality impact and/or a complexity impact and/or an energy impact, of applying in-loop filtering or post-filtering at said specified spatial resolution or spatial resolution range.

4. BRIEF SUMMARY OF THE DRAWINGS

5. DETAILED DESCRIPTION

The following examples of embodiments are described in the context of a video format similar to VVC. However, these embodiments are not limited to the video coding/decoding method corresponding to VVC. These embodiments are in particular adapted to any video format allowing generating video streams comprising pictures having different resolutions and in which the reconstructed resolution of a picture could be different from its display resolution or from the resolution used for temporal prediction. Such formats comprise for example the standard HEVC, AVC, EVC (Essential Video Coding/MPEG-5), AV1 and VP9.

Figure 2:
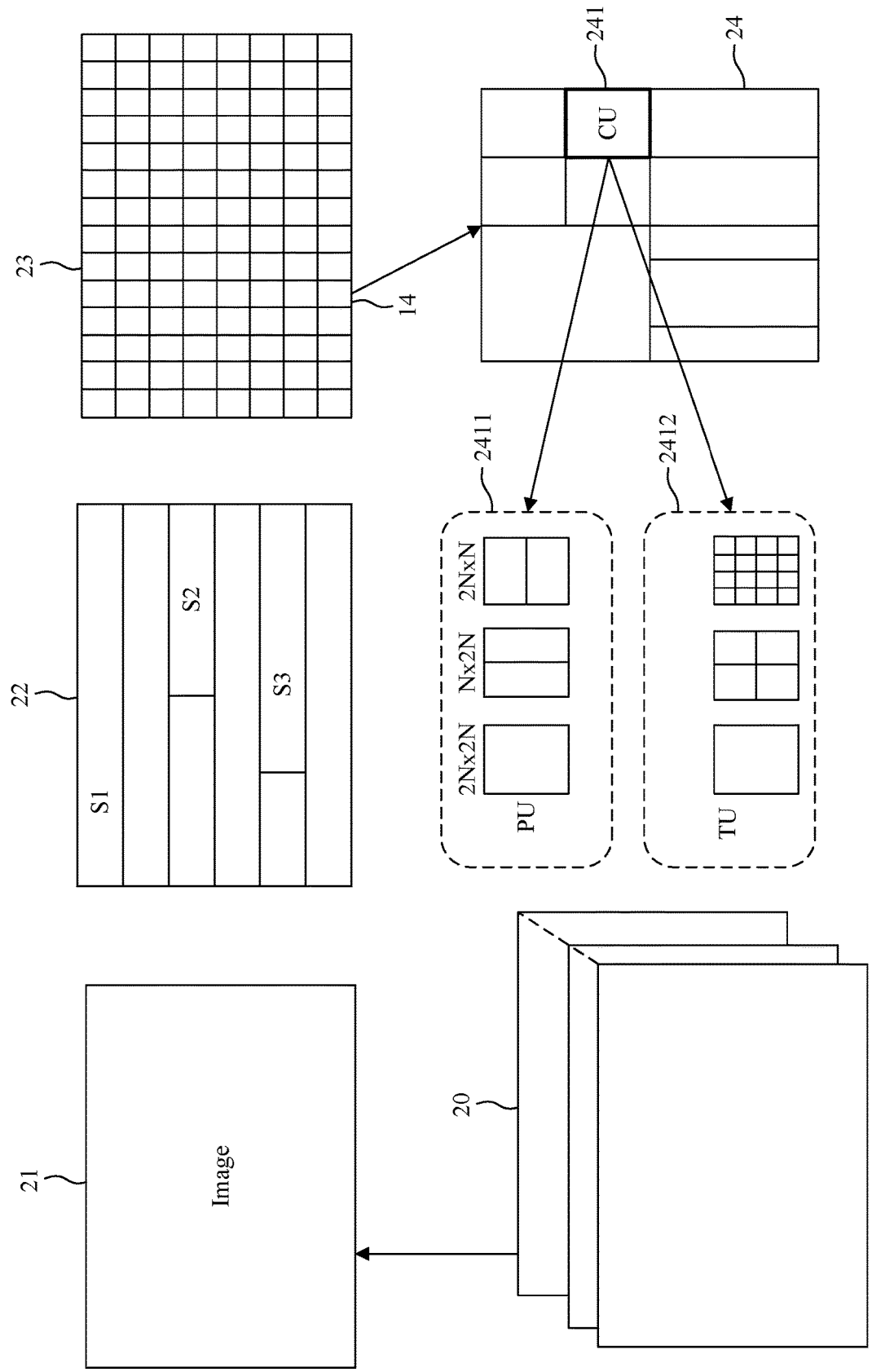
FIG. 2 illustrates schematically an example of partitioning undergone by a picture of pixels of an original video.
Figure 3:
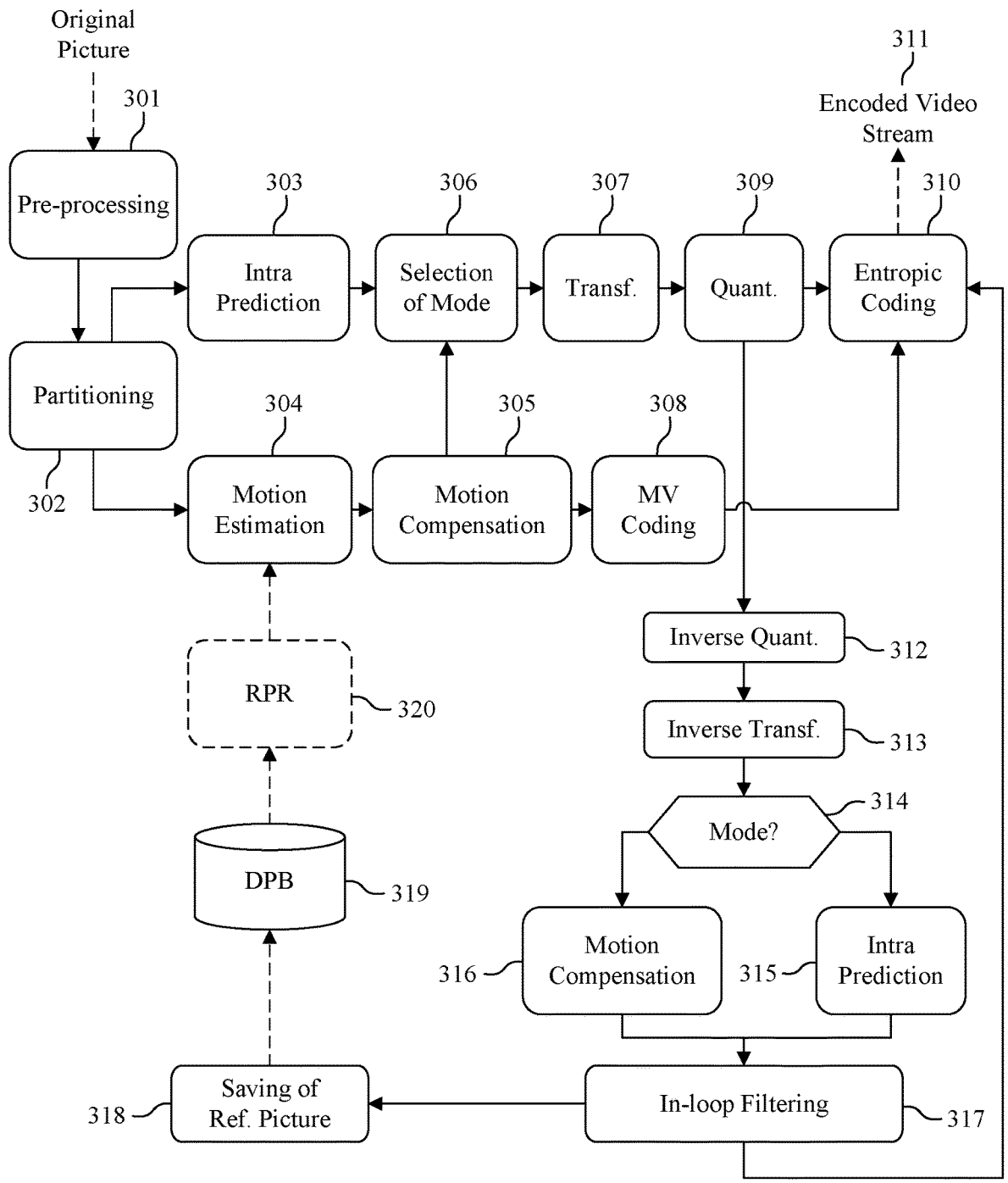
FIG. 3 depicts schematically a method for encoding a video stream.
Figure 4:
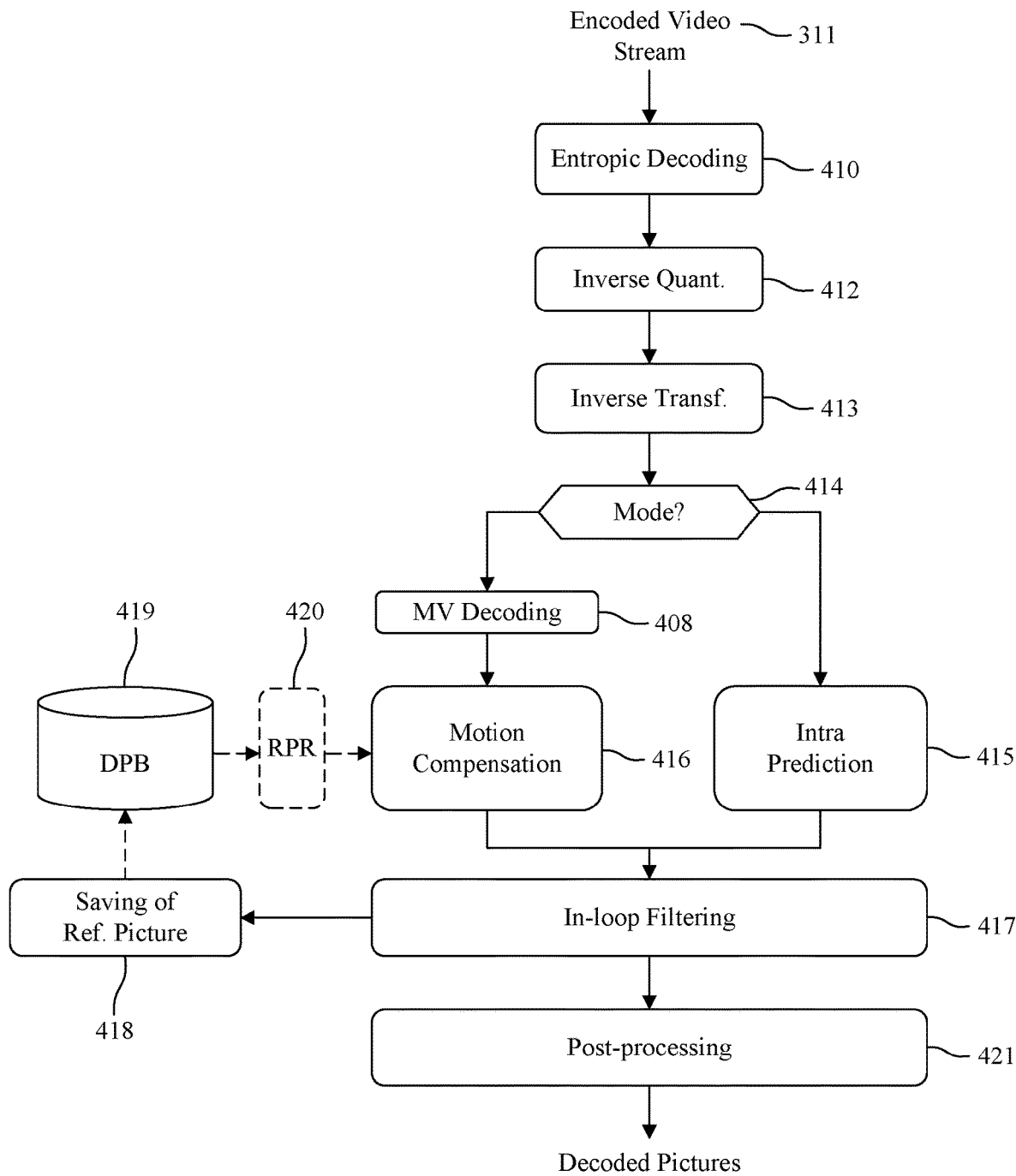
FIG. 4 depicts schematically a method for decoding an encoded video stream.

FIGS. 2, 3 and 4 introduce an example of video format.

FIG. 2 illustrates an example of partitioning undergone by an picture of pixels 21 of an original video 20. It is considered here that a pixel is composed of three components: a luminance component and two chrominance components. Other types of pixels are however possible comprising less or more components such as only a luminance component or an additional depth component.

A picture is divided into a plurality of coding entities. First, as represented by reference 23 in FIG. 2, a picture is divided in a grid of blocks called coding tree units (CTU). A CTU consists of an N×N block of luminance samples together with two corresponding blocks of chrominance samples. N is generally a power of two having a maximum value of "128" for example. Second, a picture is divided into one or more groups of CTU. For example, it can be divided into one or more tile rows and tile columns, a tile being a sequence of CTU covering a rectangular region of a picture. In some cases, a tile could be divided into one or more bricks, each of which consisting of at least one row of CTU within the tile. Above the concept of tiles and bricks, another encoding entity, called slice, exists, that can contain at least one tile of a picture or at least one brick of a tile.

In the example in FIG. 2, as represented by reference 22, the picture 21 is divided into three slices S1, S2 and S3 of the raster-scan slice mode, each comprising a plurality of tiles (not represented), each tile comprising only one brick.

Figure 1:
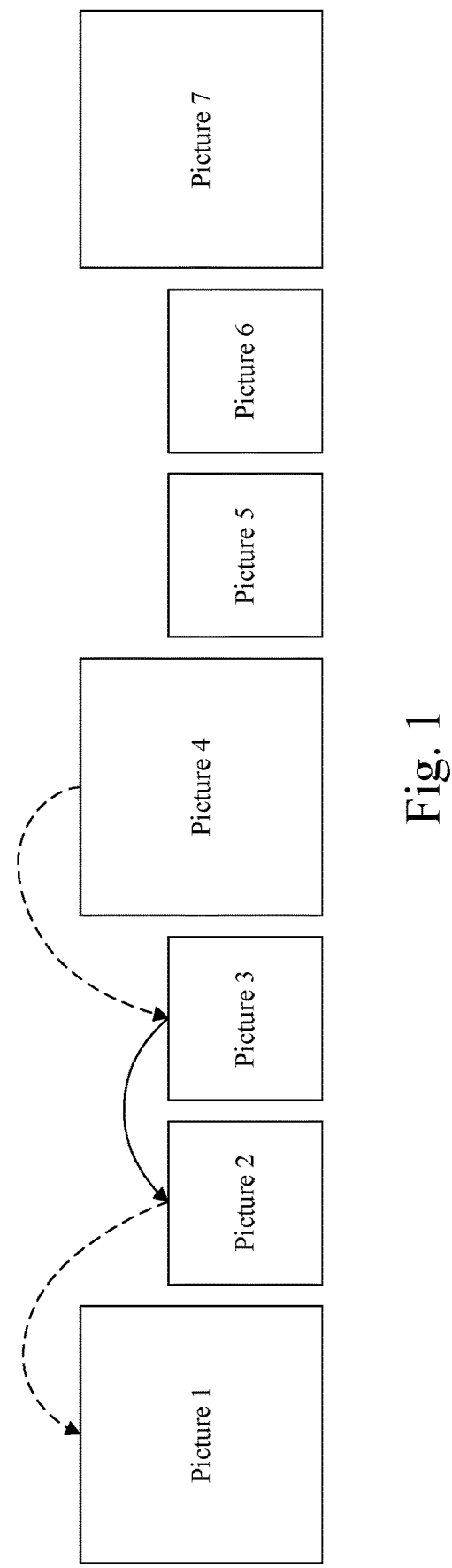
FIG. 1 represents a application of the reference picture resampling tool.

As represented by reference 24 in FIG. 1, a CTU may be partitioned into the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned.

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of a picture, the partitioning is adaptive, each CTU being partitioned so as to optimize a compression efficiency of the CTU criterion.

In HEVC appeared the concept of prediction unit (PU) and transform unit (TU). Indeed, in HEVC, the coding entity that is used for prediction (i.e. a PU) and transform (i.e. a TU) can be a subdivision of a CU. For example, as represented in FIG. 1, a CU of size 2N×2N, can be divided in PU 2411 of size N×2N or of size 2N×N. In addition, said CU can be divided in "4" TU 2412 of size N×N or in "16" TU of size $$\left(\frac{N}{2}\right) \times \left(\frac{N}{2}\right).$$

One can note that in VVC, except in some particular cases, frontiers of the TU and PU are aligned on the frontiers of the CU. Consequently, a CU comprises generally one TU and one PU.

In the present application, the term "block" or "picture block" can be used to refer to any one of a CTU, a CU, a PU and a TU. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably. Usually, but not necessarily, the term "reconstructed" is used at the encoder side while "decoded" is used at the decoder side.

FIG. 3 depicts schematically a method for encoding a video stream executed by an encoding module. Variations of this method for encoding are contemplated, but the method for encoding of FIG. 3 is described below for purposes of clarity without describing all expected variations.

Before being encoded, a current original image of an original video sequence may go through a pre-processing. For example, in a step 301, a color transform is applied to the current original picture (e.g., conversion from RGB 4:4:4 to YCbCr 4:2:0), or a remapping is applied to the current original picture components in order to get a signal distribution more resilient to compression (for instance using a histogram equalization of one of the color components). In addition, the pre-processing 301 may comprise a resampling (a down-sampling or an up-sampling). The resampling may be applied to some pictures so that the generated bitstream may comprise pictures at the original resolution and picture at another resolution. The resampling consists generally in a down-sampling and is used to reduce the bitrate of the generated bitstream. Nevertheless, up-sampling is also possible. Pictures obtained by pre-processing are called pre-processed pictures in the following.

The encoding of the pre-processed pictures begins with a partitioning of the pre-processed picture during a step 302, as described in relation to FIG. 1. The pre-processed picture is thus partitioned into CTU, CU, PU, TU, etc. For each block, the encoding module determines a coding mode between an intra prediction and an inter prediction.

The intra prediction consists of predicting, in accordance with an intra prediction method, during a step 303, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of an picture preceding or following the current picture, this picture being referred to as the reference picture. During the coding of a current block in accordance with the inter prediction method, a block of the reference picture closest, in accordance with a similarity criterion, to the current block is determined by a motion estimation step 304. During step 304, a motion vector indicating the position of the reference block in the reference picture is determined. Said motion vector is used during a motion compensation step 305 during which a residual block is calculated in the form of a difference between the current block and the reference block. In first video compression standards, the mono-directional inter prediction mode described above was the only inter mode available. As video compression standards evolve, the family of inter modes has grown significantly and comprises now many different inter modes.

During a selection step 306, the prediction mode optimising the compression performances, in accordance with a rate/distortion optimization criterion (i.e. RDO criterion), among the prediction modes tested (Intra prediction modes, Inter prediction modes), is selected by the encoding module.

When the prediction mode is selected, the residual block is transformed during a step 307 and quantized during a step 309. Note that the encoding module can skip the transform and apply quantization directly to the non-transformed residual signal. When the current block is coded according to an intra prediction mode, a prediction direction and the transformed and quantized residual block are encoded by an entropic encoder during a step 310. When the current block is encoded according to an inter prediction, when appropriate, a motion vector of the block is predicted from a prediction vector selected from a set of motion vectors corresponding to reconstructed blocks situated in the vicinity of the block to be coded. The motion information is next encoded by the entropic encoder during step 310 in the form of a motion residual and an index for identifying the prediction vector. The transformed and quantized residual block is encoded by the entropic encoder during step 310. Note that the encoding module can bypass both transform and quantization, i.e., the entropic encoding is applied on the residual without the application of the transform or quantization processes. The result of the entropic encoding is inserted in an encoded video stream 311.

Metadata such as SEI (supplemental enhancement information) messages can be attached to the encoded video stream 311. A SEI (Supplemental Enhancement Information) message as defined for example in standards such as AVC, HEVC or VVC is a data container associated to a video stream and comprising metadata providing information relative to the video stream.

Some SEI messages were defined to transport post-filtering information. An example of such SEI message is the depicted in table TAB1.

TABLE TAB1

```
post_filter_hint( payloadSize ) {
  filter_hint_size_y
  filter_hint_size_x
  filter_hint_type
  for( cIdx = 0; cIdx < ( chroma_format_idc == 0 ? 1 : 3 );
cIdx++ )
    for( cy = 0; cy < filter_hint_size_y; cy ++ )
      for( cx = 0; cx < filter_hint_size_x; cx ++ )
        filter_hint_value[ cIdx ][ cy ][ cx ]
}
```

Said SEI message allows defining a filter for post-filtering pictures.

In another example, in document JVET-R0190 (Post-filter hint based on ALF classification, Han Boon Teo, Hai Wei Sun, Chong Soon Lim, Joint Video Experts Team (JVET) of ITU-T SG 16 WP 3 and ISO/IEC JTC 1/SC 29/WG-11, 18th Meeting: by teleconference, 15-24 Apr. 2020), it is proposed to move ALF from the set of in-loop filtering tools to a post-filtering tool. A SEI message called adaptive_loop_filter_control describing ALF parameters is therefore proposed and represented in table TAB2:

TABLE TAB2

```
adaptive_loop_filter_control(
payloadSize ) {
  alf_luma_filter_enable_flag
  alf_cb_filter_enable_flag
  alf_cr_filter_enable_flag
  alf_cc_cb_filter_enable_flag
  alf_cc_cr_filter_enable_flag
  alf_data( )
}
```

As already mentioned above, one issue when post-filtering and RPR, or post-filtering and downsampling/upsampling as pre-processing, are used jointly is that there is no indication of the resolution at which post-filtering shall or should be performed.

Similarly, a film grain SEI is defined in VVC and other codecs. It aims at re-synthetizing noise in the decoding picture, for instance approximating the noise present in the original picture, that may have been removed by a pre-encoding processing step. The film grain SEI does not contain information on the resolution at which the film grain synthesis shall or should be performed.

After the quantization step 309, the current block is reconstructed so that the pixels corresponding to that block can be used for future predictions. This reconstruction phase is also referred to as a prediction loop. An inverse quantization is therefore applied to the transformed and quantized residual block during a step 312 and an inverse transformation is applied during a step 313. According to the prediction mode used for the block obtained during a step 314, the prediction block of the block is reconstructed. If the current block is encoded according to an inter prediction mode, the encoding module applies, when appropriate, during a step 316, a motion compensation using the motion vector of the current block in order to identify the reference block of the current block. If the current block is encoded according to an intra prediction mode, during a step 315, the prediction direction corresponding to the current block is used for reconstructing the reference block of the current block. The reference block and the reconstructed residual block are added in order to obtain the reconstructed current block.

Following the reconstruction, an in-loop filtering intended to reduce the encoding artefacts is applied, during a step 317, to the reconstructed block. This filtering is called in-loop filtering since this filtering occurs in the prediction loop to obtain at the decoder the same reference images as the encoder and thus avoid a drift between the encoding and the decoding processes. As mentioned earlier, in-loop filtering tools comprises deblocking filtering, SAO and ALF.

The purpose of deblocking filtering is to attenuate discontinuities at block boundaries due to the differences in quantisation between blocks. It is an adaptive filtering that can be activated or deactivated and, when it is activated, that can take the form of a high-complexity deblocking filtering based on a separable filter with a dimension comprising six filter coefficients, which is referred to hereinafter as strong deblocking filter (SDBF), and a low-complexity deblocking filtering based on a separable filter with one dimension comprising four coefficients, which is referred to hereinafter as weak deblocking filter (WDBF). The SDBF greatly attenuates discontinuities at the block boundaries, which may damage spatial high frequencies present in original pictures. The WDBF weakly attenuates discontinuities at the block boundaries, which makes it possible to preserve high spatial frequencies present in the original pictures but which will be less effective on discontinuities artificially created by the quantisation. The decision to filter or not to filter, and the form of the filter used in the event of filtering, depend among other things on the value of the pixels at the boundaries of the block to be filtered. However, this decision doesn't take into account a potential resampling of the reconstructed pictures. One may wonder why applying a SDBF on block boundaries, if this filter is then followed by an up-sampling on the decoder side which attenuates further spatial high frequencies.

Parameters representative of the deblocking filter are introduced in the encoded video stream 311 during the entropic coding step 310.

SAO filtering takes two forms having two different objectives. The purpose of the first form, referred to as edge offset, is to compensate for the effects of the quantisation on the edges in the blocks. SAO filtering by edge offset comprises a classification of the pixels of the reconstructed image in accordance with four categories corresponding to four respective types of edge. The classification of a pixel is done by filtering according to four filters, each filter making it possible to obtain the filtering gradient. The filtering gradient maximising a classification criterion indicates the type of edge corresponding to the pixel. Each type of edge is associated with an offset value that is added to the pixels during the SAO filtering. Again, one may wonder if it is judicious to apply SAO edge offset on an image if this filter is then followed by an up-sampling on the decoder side which affects the enhanced edges.

The second form of SAO is referred to as band offset and its purpose is to compensate for the effect of the quantisation of the pixels belonging to certain ranges (i.e. bands) of values. In band-offset filtering, all the possible values for a pixel, most frequently lying between "0" and "255" for 8-bit video streams, is divided into thirty-two bands of eight values. Among these thirty-two bands, four consecutive bands are selected to be offset. When a pixel has a value lying in one of the four bands of values to be offset, an offset value is added to the value of the pixel.

The decision to use SAO filtering and, when SAO filtering is used, the form of the SAO filtering and the offset values are determined for each CTU by during the encoding process by means of a rate/distortion optimisation.

Parameters representative of the activation or the deactivation of SAO and when activated, of characteristics of SAO are introduced in the encoded video stream 311 at the slice and block level during the entropic coding step 310.

The purpose of ALF is to minimize a mean square error between original samples and decoded samples by using Wiener-based adaptive filters (note that ALF can be used for other purpose, but is in general tuned by the encoder for minimizing the mean square error). ALF is located at the last processing stage for each picture and can be regarded as a tool to catch and fix artifacts from previous stages. The ALF process consists in selecting one among a "25" filters for each 4×4 block of an image. To do so, each block is classified into one among "25" categories based on a direction and an activity of local gradients. Each filter is derived from a diamond shape filter. ALF filter parameters are signaled in Adaptation Parameter Set (APS). In one APS, up to "25" sets of luma filter coefficients and clipping value indexes, and up to eight sets of chroma filter coefficients and clipping value indexes could be signaled. To reduce bits overhead, filter coefficients of different classification for luma component can be merged. In slice header, the indices of the APSs used for a current slice are signaled.

In a slice header, up to "7" APS indices can be signaled to specify the luma filter sets that are used for the current slice. The filtering process can be further controlled at the block level. A flag is always signaled to indicate whether ALF is applied to a luma block. A luma block can choose a filter set among "16" fixed filter sets and the filter sets from APSs. A filter set index is signaled for a luma block to indicate which filter set is applied. The "16" fixed filter sets are pre-defined and hard-coded in both the encoder and the decoder.

For chroma component, an APS index is signaled in slice header to indicate the chroma filter sets being used for the current slice. At block level, a filter index is signaled for each chroma block if there is more than one chroma filter set in the APS.

Again, one may wonder why applying ALF to reduce artifacts if artifacts are then introduced by a resampling stage.

When a block is reconstructed, it is inserted during a step 318 into a reconstructed picture stored in a memory 319 of reconstructed images corresponding to the DPB. The reconstructed images thus stored can then serve as reference images for other images to be coded.

When RPR is activated, samples from (i.e; at least a portion of) pictures stored in the DPB are resampled in a step 320 when used for motion estimation and compensation. The resampling step (320) and motion compensation step (304) can be in some implementations combined in one single sample interpolation step. Note that the motion estimation step (304), which actually uses motion compensation, would in this case also use the single sample interpolation step. As already mentioned above, one issue when in-loop/post-filtering and RPR are used jointly is that there is no indication of the resolution at which in-loop/post-filtering shall or should be performed. However, generally, in-loop filtering is performed at the resolution of reconstruction, which may prevent from obtaining the fullness of the improvements provided by the in-loop filtering.

FIG. 4 depicts schematically a method for decoding the encoded video stream 311 encoded according to method described in relation to FIG. 3 executed by a decoding module. Variations of this method for decoding are contemplated, but the method for decoding of FIG. 4 is described below for purposes of clarity without describing all expected variations.

The decoding is done block by block. For a current block, it starts with an entropic decoding of the current block during a step 410. Entropic decoding allows to obtain the prediction mode of the block.

If the block has been encoded according to an inter prediction mode, the entropic decoding allows to obtain, when appropriate, a prediction vector index, a motion residual and a residual block. During a step 408, a motion vector is reconstructed for the current block using the prediction vector index and the motion residual.

If the block has been encoded according to an intra prediction mode, entropic decoding allows to obtain a prediction direction and a residual block. Steps 412, 413, 414, 415, 416 and 417 implemented by the decoding module are in all respects identical respectively to steps 412, 413, 414, 415, 416 and 417 implemented by the encoding module. Decoded blocks are saved in decoded pictures and the decoded pictures are stored in a DPB 419 in a step 418. When the decoding module decodes a given picture, the pictures stored in the DPB 419 are identical to the pictures stored in the DPB 319 by the encoding module during the encoding of said given image. The decoded picture can also be outputted by the decoding module for instance to be displayed. When RPR is activated, samples of (i.e. at least a portion of) the picture used as reference pictures are resampled in step 420 to the resolution of the predicted picture with the same issue as in step 320 on the encoder side. The resampling step (420) and motion compensation step (416) can be in some implementations combined in one single sample interpolation step.

The decoded image can further go through post-processing in step 421. The post-processing can comprise an inverse color transform (e.g. conversion from YCbCr 4:2:0 to RGB 4:4:4), an inverse mapping performing the inverse of the remapping process performed in the pre-processing of step 301, a post-filtering for improving the reconstructed pictures based for example on filter parameters provided in a SEI message and/or a resampling for example for adjusting the output images to display constraints. This resampling is another occasion to attenuate the improvements provided by the in-loop filtering and the post-filtering.

Figure 5A:
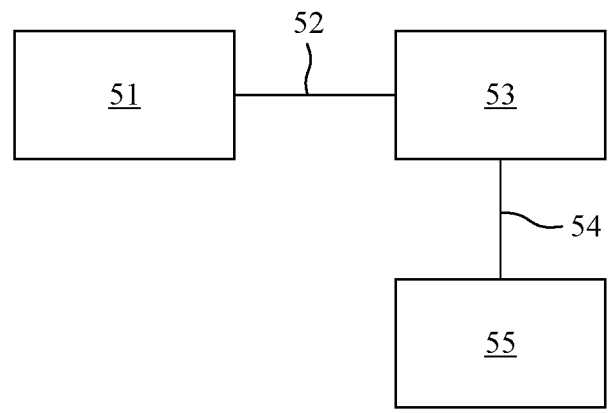
FIG. 5A illustrates schematically an example of video streaming system in which embodiments are implemented.

FIG. 5A describes an example of a context in which following embodiments can be implemented.

In FIG. 4A, an apparatus 51, that could be a camera, a storage device, a computer, a server or any device capable of delivering a video stream, transmits a video stream to a system 53 using a communication channel 52. The video stream is either encoded and transmitted by the apparatus 51 or received and/or stored by the apparatus 51 and then transmitted. The communication channel 52 is a wired (for example Internet or Ethernet) or a wireless (for example WiFi, 3G, 4G or 5G) network link.

The system 53, that could be for example a set top box, receives and decodes the video stream to generate a sequence of decoded pictures.

The obtained sequence of decoded pictures is then transmitted to a display system 55 using a communication channel 54, that could be a wired or wireless network. The display system 55 then displays said pictures.

In an embodiment, the system 53 is comprised in the display system 55. In that case, the system 53 and display 55 a comprised in a TV, a computer, a tablet, a smartphone, a head-mounted display, etc.

Figure 5B:
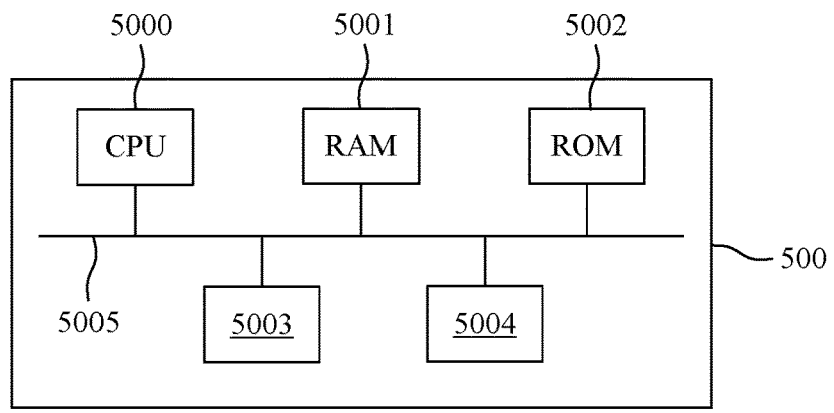
FIG. 5B illustrates schematically an example of hardware architecture of a processing module able to implement an encoding module or a decoding module in which various aspects and embodiments are implemented.

FIG. 5B illustrates schematically an example of hardware architecture of a processing module 500 able to implement an encoding module or a decoding module capable of implementing respectively a method for encoding of FIG. 3 and a method for decoding of FIG. 4 modified according to different aspects and embodiments. The encoding module is for example comprised in the apparatus 51 when this apparatus is in charge of encoding the video stream. The decoding module is for example comprised in the system 53. The processing module 500 comprises, connected by a communication bus 5005: a processor or CPU (central processing unit) 5000 encompassing one or more microprocessors, general purpose computers, special purpose computers, and processors based on a multi-core architecture, as non-limiting examples; a random access memory (RAM) 5001; a read only memory (ROM) 5002; a storage unit 5003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 5004 for exchanging data with other modules, devices or equipment. The communication interface 5004 can include, but is not limited to, a transceiver configured to transmit and to receive data over a communication channel. The communication interface 5004 can include, but is not limited to, a modem or network card.

If the processing module 500 implements a decoding module, the communication interface 5004 enables for instance the processing module 500 to receive encoded video streams and to provide a sequence of decoded pictures. If the processing module 500 implements an encoding module, the communication interface 5004 enables for instance the processing module 500 to receive a sequence of original picture data to encode and to provide an encoded video stream.

The processor 5000 is capable of executing instructions loaded into the RAM 5001 from the ROM 5002, from an external memory (not shown), from a storage medium, or from a communication network. When the processing module 500 is powered up, the processor 5000 is capable of reading instructions from the RAM 5001 and executing them. These instructions form a computer program causing, for example, the implementation by the processor 5000 of a decoding method as described in relation with FIG. 4 or an encoding method described in relation to FIG. 3, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5C:
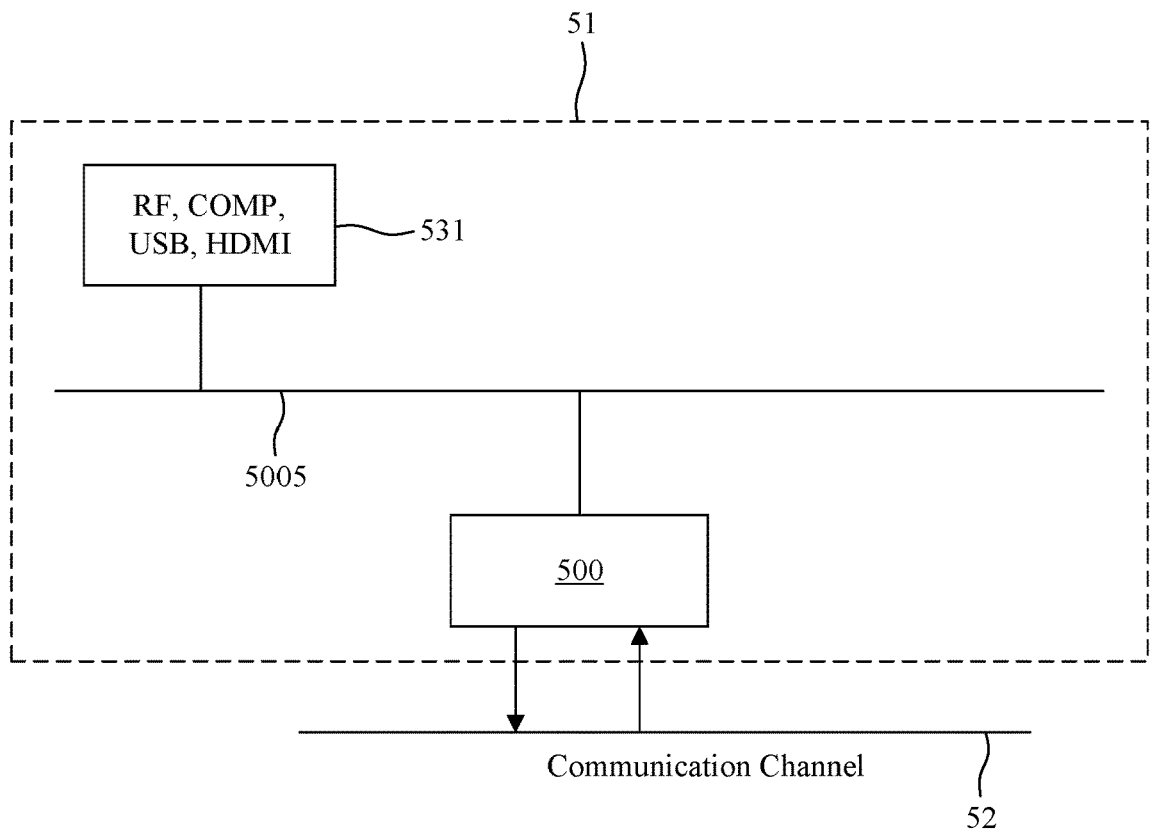
FIG. 5C illustrates a block diagram of an example of a first system in which various aspects and embodiments are implemented.
Figure 5D:
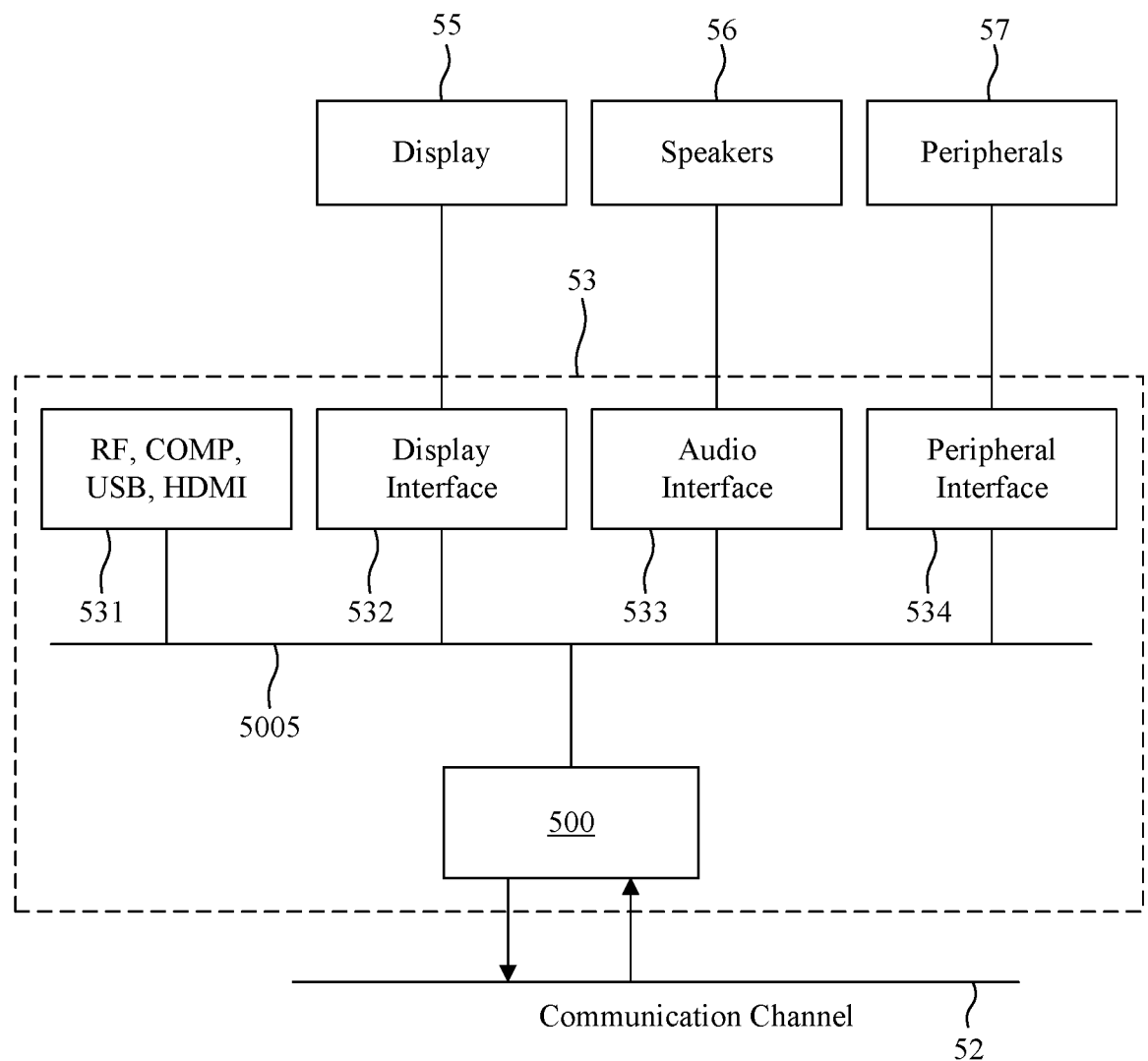
FIG. 5D illustrates a block diagram of an example of a second system in which various aspects and embodiments are implemented.

FIG. 5D illustrates a block diagram of an example of the system 53 in which various aspects and embodiments are implemented. The system 53 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances and head mounted display. Elements of system 53, singly or in combination, can be embodied in a single integrated circuit (IC), multiple ICs, and/or discrete components. For example, in at least one embodiment, the system 53 comprises one processing module 500 that implements a decoding module. In various embodiments, the system 53 is communicatively coupled to one or more other systems, or other electronic devices, via, for example, a communications bus or through dedicated input and/or output ports. In various embodiments, the system 53 is configured to implement one or more of the aspects described in this document.

The input to the processing module 500 can be provided through various input modules as indicated in block 531. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5D, include composite video.

In various embodiments, the input modules of block 531 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 53 to other electronic devices across USB and/or HDMI connections. It is to be understood that various aspects of input processing, for example, Reed-Solomon error correction, can be implemented, for example, within a separate input processing IC or within the processing module 500 as necessary. Similarly, aspects of USB or HDMI interface processing can be implemented within separate interface ICs or within the processing module 500 as necessary. The demodulated, error corrected, and demultiplexed stream is provided to the processing module 500.

Various elements of system 53 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 53, the processing module 500 is interconnected to other elements of said system 53 by the bus 5005.

The communication interface 5004 of the processing module 500 allows the system 53 to communicate on the communication channel 52. As already mentioned above, the communication channel 52 can be implemented, for example, within a wired and/or a wireless medium.

Data is streamed, or otherwise provided, to the system 53, in various embodiments, using a wireless network such as a Wi-Fi network, for example IEEE 802.11 (IEEE refers to the Institute of Electrical and Electronics Engineers). The Wi-Fi signal of these embodiments is received over the communications channel 52 and the communications interface 5004 which are adapted for Wi-Fi communications. The communications channel 52 of these embodiments is typically connected to an access point or router that provides access to external networks including the Internet for allowing streaming applications and other over-the-top communications. Other embodiments provide streamed data to the system 53 using the RF connection of the input block 531. As indicated above, various embodiments provide data in a non-streaming manner. Additionally, various embodiments use wireless networks other than Wi-Fi, for example a cellular network or a Bluetooth network.

The system 53 can provide an output signal to various output devices, including the display system 55, speakers 56, and other peripheral devices 57. The display system 55 of various embodiments includes one or more of, for example, a touchscreen display, an organic light-emitting diode (OLED) display, a curved display, and/or a foldable display. The display 55 can be for a television, a tablet, a laptop, a cell phone (mobile phone), a head mounted display or other devices. The display system 55 can also be integrated with other components (for example, as in a smart phone), or separate (for example, an external monitor for a laptop). The other peripheral devices 57 include, in various examples of embodiments, one or more of a stand-alone digital video disc (or digital versatile disc) (DVR, for both terms), a disk player, a stereo system, and/or a lighting system. Various embodiments use one or more peripheral devices 57 that provide a function based on the output of the system 53. For example, a disk player performs the function of playing an output of the system 53.

In various embodiments, control signals are communicated between the system 53 and the display system 55, speakers 56, or other peripheral devices 57 using signaling such as AV.Link, Consumer Electronics Control (CEC), or other communications protocols that enable device-to-device control with or without user intervention. The output devices can be communicatively coupled to system 53 via dedicated connections through respective interfaces 532, 533, and 534. Alternatively, the output devices can be connected to system 53 using the communications channel 52 via the communications interface 5004 or a dedicated communication channel corresponding to the communication channel 54 in FIG. 5A via the communication interface 5004. The display system 55 and speakers 56 can be integrated in a single unit with the other components of system 53 in an electronic device such as, for example, a television. In various embodiments, the display interface 532 includes a display driver, such as, for example, a timing controller (T Con) chip.

The display system 55 and speaker 56 can alternatively be separate from one or more of the other components. In various embodiments in which the display system 55 and speakers 56 are external components, the output signal can be provided via dedicated output connections, including, for example, HDMI ports, USB ports, or COMP outputs.

FIG. 5C illustrates a block diagram of an example of the system 51 in which various aspects and embodiments are implemented. System 51 is very similar to system 53. The system 51 can be embodied as a device including the various components described below and is configured to perform one or more of the aspects and embodiments described in this document. Examples of such devices include, but are not limited to, various electronic devices such as personal computers, laptop computers, smartphones, tablet computers, a camera and a server. Elements of system 51, singly or in combination, can be embodied in a single integrated circuit (IC), multiple ICs, and/or discrete components. For example, in at least one embodiment, the system 51 comprises one processing module 500 that implements an encoding module. In various embodiments, the system 51 is communicatively coupled to one or more other systems, or other electronic devices, via, for example, a communications bus or through dedicated input and/or output ports. In various embodiments, the system 51 is configured to implement one or more of the aspects described in this document.

The input to the processing module 500 can be provided through various input modules as indicated in block 531 already described in relation to FIG. 5D.

Various elements of system 51 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 51, the processing module 500 is interconnected to other elements of said system 51 by the bus 5005.

The communication interface 5004 of the processing module 500 allows the system 500 to communicate on the communication channel 52.

Data is streamed, or otherwise provided, to the system 51, in various embodiments, using a wireless network such as a Wi-Fi network, for example IEEE 802.11 (IEEE refers to the Institute of Electrical and Electronics Engineers). The Wi-Fi signal of these embodiments is received over the communications channel 52 and the communications interface 5004 which are adapted for Wi-Fi communications. The communications channel 52 of these embodiments is typically connected to an access point or router that provides access to external networks including the Internet for allowing streaming applications and other over-the-top communications. Other embodiments provide streamed data to the system 51 using the RF connection of the input block 531.

As indicated above, various embodiments provide data in a non-streaming manner. Additionally, various embodiments use wireless networks other than Wi-Fi, for example a cellular network or a Bluetooth network.

The data provided to the system 51 can be provided in different format. In various embodiments these data are encoded and compliant with a known video compression format such as AV1, VP9, VVC, HEVC, AVC, etc. In various embodiments, these data are raw data provided by a picture and/or audio acquisition module connected to the system 51 or comprised in the system 51. In that case, the processing module take in charge the encoding of these data.

The system 51 can provide an output signal to various output devices capable of storing and/or decoding the output signal such as the system 53.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example, for determining at which resolution applying an in-loop filtering or a post-filtering.

As further examples, in one embodiment "decoding" refers only to the in-loop filterings of step 417 and/or post-processing of step 421. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy encoding. In various embodiments, such processes also, or alternatively, include processes performed by an encoder of various implementations described in this application, for example, for providing information allowing a decoder determining at which resolution performing in-loop filtering or post-filtering.

As further examples, in one embodiment "encoding" refers to quantization (209) and/or transform (207) and/or in-loop filtering (step 217). Whether the phrase "encoding process" is intended to refer specifically to a subset of operations or generally to the broader encoding process will be clear based on the context of the specific descriptions and is believed to be well understood by those skilled in the art.

Note that the syntax elements names as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream and SEI messages of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 6:
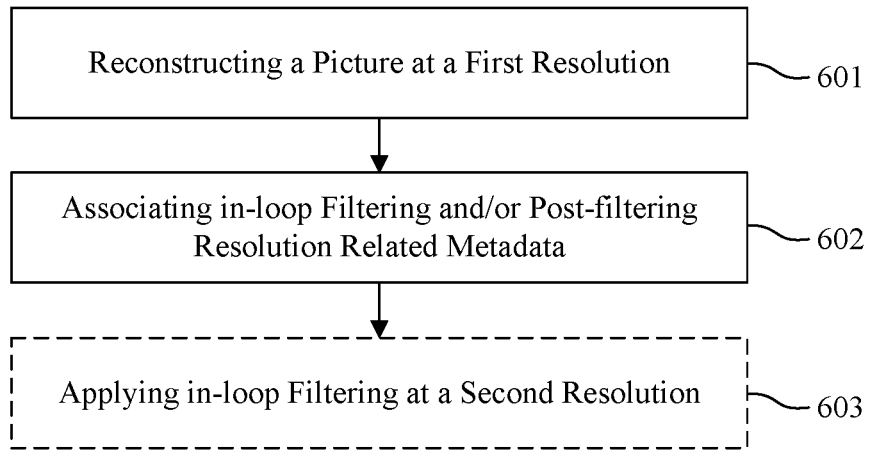
FIG. 6 illustrates schematically an example of method for adapting the spatial resolution of in-loop and post-filtering on a decoder side; and, FIG. 7 represents schematically a method using information contained in SEI messages to control a decoding and/or a display process on an encoder side.

FIG. 6 illustrates schematically an example of method for adapting the spatial resolution of in-loop and post-filtering on an encoder side.

The method described in relation with FIG. 6 is executed by the processing module 500 when this processing module is embedded in the system 51.

In a step 601, the processing module 500 applies steps 301 to 310 and steps 312 to 316 to encode a current picture as a portion of the encoded video stream 311 and obtains a reconstructed version of said current picture, called reconstructed current picture, at step 317. The reconstructed current picture is reconstructed at a first spatial resolution. In case of RPR implemented jointly with motion compensation, the step 316 can be considered as a joint resampling and motion compensation achieved in one single sample interpolation step.

In a step 602, the processing module 500 associates, to the current picture, metadata, called filtering resolution metadata in the following, representative of an information specifying that applying at least one in-loop filtering and/or at least one post filtering on at least a portion of said reconstructed current picture at a second spatial resolution different from the first spatial resolution is allowed.

As seen above, the filtering resolution metadata concern either in-loop filtering, post-filtering or both. One particular case arises on the encoder side when the filtering resolution metadata concern the in-loop filtering. Indeed, in that case, in order to ensure a symmetry between the encoding and the decoding process, the encoder must apply the same in-loop filtering than the decoder. Hence, when in-loop filtering is concerned, the spatial resolution at which the in-loop filtering is applied depends on the value of the filtering resolution metadata. If the filtering resolution metadata indicates that applying at least one in-loop filtering at a second resolution is allowed, the method of FIG. 6 comprises an additional step 603, during which the processing module 500 applies in-loop filtering at, at least, one second spatial resolution. This step can be applied after the resampling step and before the motion compensation step, or after the resampling and the motion compensation steps applied separately, or after a single sample interpolation step combining the resampling and the motion compensation steps. Referring to FIG. 3, this single sample interpolation step would therefore be applied just after step 305, and before step 308.

In a first embodiment of step 602, an information is inserted in the in-loop or post-filter metadata to indicate that the filtering process can be performed at, at least, one second spatial resolution different from the first spatial resolution, however without specifying any second spatial resolution.

For instance, in a first variant of the first embodiment of step 602, based on the SEI message depicted in table TAB1, a syntax element filter_hint_decoded_resolution_recommended_flag is inserted as depicted in table TAB3.

TABLE TAB3

```
post_filter_hint( payloadSize ) {
   filter_hint_decoded_resolution_recommended_flag
   filter_hint_size_y
   filter_hint_size_x
   filter_hint_type
   for( cIdx = 0; cIdx < ( chroma_format_idc = = 0 ? 1 : 3 );
cIdx++ )
      for( cy = 0; cy < filter_hint_size_y; cy ++ )
         for( cx = 0; cx < filter_hint_size_x; cx ++ )
            filter_hint_value[ cIdx ][ cy ][ cx ]
}
``` filter_hint_decoded_resolution_recommended_flag equal to "1" indicates that the post-filter specified in the SEI message is recommended to be applied to the non-resampled decoded picture of width equal to pic_width_in_luma_samples and height equal to pic_height_in_luma_samples. pic_width_in_luma_samples specifies a width of a decoded picture in units of luma samples as defined in HEVC. pic_height_in_luma_samples specifies a height of a decoded picture in units of luma samples as defined in HEVC.

filter_hint_decoded_resolution_recommended_flag equal to "0" indicates that the post-filter is not specifically recommended to be applied to the non-resampled decoded picture and can be applied to a version of the decoded picture resampled to a picture with a width different from pic_width_in_luma_samples and/or a height different from pic_height_in_luma_samples.

In a second variant of the first embodiment of step 602, said information is included in an existing syntax element filter_hint_type. Filter_hint_type, as specified in HEVC, identifies a type of transmitted filter hints. For example, filter_hint_type values (currently defined in HEVC from "0" to "2") can be extended as shown in the table TAB4.

TABLE TAB4

| Value | Description | Recommended to be applied to non-resampled decoded picture |
| --- | --- | --- |
| 0 | Coefficients of a 2D-FIR filter | Yes |
| 1 | Coefficients of two 1D-FIR filters | Yes |
| 2 | Cross-correlation matrix | Yes |
| 3 | Coefficients of a 2D-FIR filter | No |

TABLE TAB4-continued

| Value | Description | Recommended to be applied to non-resampled decoded picture |
| --- | --- | --- |
| 4 | Coefficients of two 1D-FIR filters | No |
| 6 | Cross-correlation matrix | No |

New values are represented in bold. The left column specifying if the post-filtering is recommended to be applied on the non-resampled decoded picture has been added.

In a third variant of the first embodiment of step 602, said information is included in the SEI message adaptive_loop_filter_control proposed in document JVET-R0190. A new syntax element alf_filter_decoded_resolution_recommended_flag is inserted as depicted in table TAB5:

TABLE TAB5

```
adaptive_loop_filter_control( payloadSize ) {
   alf_luma_filter_enable_flag
   alf_cb_filter_enable_flag
   alf_cr_filter_enable_flag
   alf_cc_cb_filter_enable_flag
   alf_cc_cr_filter_enable_flag
   if( alf_luma_filter_enable_flag ||
alf_cb_filter_enable_flag ||
         alf_cr_filter_enable_flag )
      alf_filter_decoded_resolution_recommended_flag
   alf_data( )
}
``` alf_filter_decoded_resolution_recommended_flag equal to "1" indicates that the ALF filter specified in the SEI message is recommended to be applied to the non-resampled decoded picture of width equal to pic_width_in_luma_samples and height equal to pic_height_in_luma_samples.

alf_filter_decoded_resolution_recommended_flag equal to "0" indicates that the ALF filter is not specifically recommended to be applied to the non-resampled decoded picture and can be applied to a version of the decoded picture resampled to a picture with a width different from pic_width_in_luma_samples and/or a height different from pic_height_in_luma_samples.

In a fourth variant of the first embodiment of step 602, said information is included in the SEI message film_grain_characteristics specified in AVC and HEVC. A new syntax element film_grain_decoded_resolution_recommended_flag is inserted as depicted in table TAB6:

TABLE TAB6

```
film_grain_characteristics( payloadSize ) {
   film_grain_decoded_resolution_recommended_flag
   film_grain_characteristics_cancel_flag
   if( !film_grain_characteristics_cancel_flag ) {
      film_grain_model_id
      separate_colour_description_present_flag
      if( separate_colour_description_present_flag ) {
         film_grain_bit_depth_luma_minus8
         film_grain_bit_depth_chroma_minus8
         film_grain_full_range_flag
         film_grain_colour_primaries
         film_grain_transfer_characteristics
         film_grain_matrix_coeffs
      }
```

TABLE TAB6-continued

```
    blending_mode_id
    log2_scale_factor
    for( c = 0; c < 3; c++ )
        comp_model_present_flag[ c ]
    for( c = 0; c < 3; c++ )
        if( comp_model_present_flag[ c ] ) {
            num_intensity_intervals_minus1[ c ]
            num_model_values_minus1[ c ]
            for( i = 0; i <= num_intensity_intervals_minus1[ c ]; i++ ) {
                intensity_interval_lower_bound[ c ][ i ]
                intensity_interval_upper_bound[ c ][ i ]
                for( j = 0; j <= num_model_values_minus1[ c ]; j++ )
                    comp_model_value[ c ][ i ][ j ]
            }
        }
    film_grain_characteristics_persistence_flag
    }
}
``` film_grain_decoded_resolution_recommended_flag equal to "1" indicates that the film grain specified in the SEI message is recommended to be applied to the non-resampled decoded picture of width equal to pic_width_in_luma_samples and height equal to pic_height_in_luma_samples.

film_grain_decoded_resolution_recommended_flag equal to "0" indicates that the film grain is not specifically recommended to be applied to the non-resampled decoded picture and can be applied to a version of the decoded picture resampled to a picture with a width different from pic_width_in_luma_samples and/or a height different from pic_height_in_luma_samples.

In a fifth variant of the first embodiment of step 602, said information is included in a sequence header, known as Sequence Parameter Set (SPS) in AVC, HEVC and VVC terminology. A new syntax element sps_decoded_resolution_recommended_for_ilf_flag is inserted in the SPS. Alternatively the information can be added in the APS, when the APS is the container of the in-loop filter parameters.

sps_decoded_resolution_recommended_for_ilf_flag equal to "1" indicates that the in-loop filters are recommended to be applied to the non-resampled decoded picture of width equal to pic_width_in_luma_samples and height equal to pic_height_in_luma_samples.

sps_decoded_resolution_recommended_for_ilf_flag equal to "0" indicates that the in-loop filters are not specifically recommended to be applied to the non-resampled decoded picture and can be applied to a version of the decoded picture resampled to a picture with a width different from pic_width_in_luma_samples and/or a height different from pic_height_in_luma_samples.

A similar syntax element could be also defined to target each in-loop filter separately. For example, a new syntax element sps_decoded_resolution_recommended_for_DBF_flag (respectively sps_decoded_resolution_recommended_for_SAO_flag and sps_decoded_resolution_recommended_for_ALF_flag) is inserted in the SPS.

sps_decoded_resolution_recommended_for_DBF_flag (respectively sps_decoded_resolution_recommended_for_SAO_flag and sps_decoded_resolution_recommended_for_ALF_flag) equal to "1" indicates that the deblocking filter (respectively SAO and ALF) are recommended to be applied to the non-resampled decoded picture of width equal to pic_width_in_luma_samples and height equal to pic_height_in_luma_samples.

sps_decoded_resolution_recommended_for_DBF_flag (respectively sps_decoded_resolution_recommended_for_SAO_flag and sps_decoded_resolution_recommended_for_ALF_flag) equal to "0" indicates that the deblocking filter (respectively SAO and ALF) are not specifically recommended to be applied to the non-resampled decoded picture and can be applied to a version of the decoded picture resampled to a picture with a width different from pic_width_in_luma_samples and/or a height different from pic_height_in_luma_samples.

Consequently, in-loop filtering at a second resolution different from the first resolution could be allowed for one in-loop filter but prohibited for another.

Based on the value of at least one of these syntax elements (sps_decoded_resolution_recommended_for_ilf_flag, sps_decoded_resolution_recommended_for_DBF_flag, sps_decoded_resolution_recommended_for_SOA_flag or sps_decoded_resolution_recommended_for_ALF_flag) noted below recommended_decoded_resolution_for_ilf for notation simplifications, during step 603 the processing module 500 decides at which resolution performing the in-loop filtering.

Figure 8:
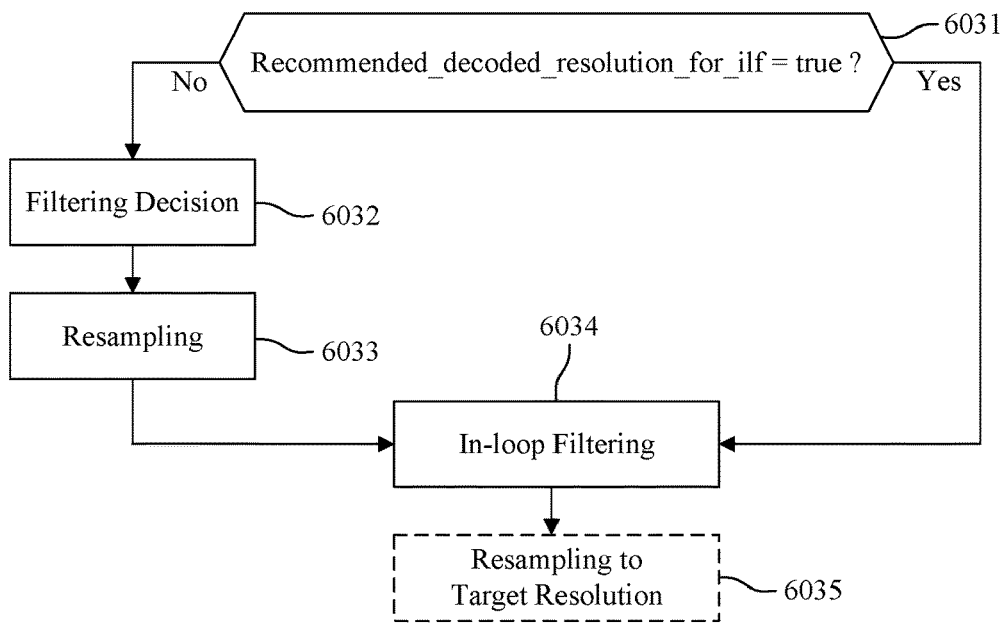
FIG. 8 illustrates schematically a detail of the method of FIG. 6.

FIG. 8 illustrates schematically an example of embodiment of step 603.

In this example, the reconstructed current picture is a reconstructed version of the current picture before in-loop filtering. Step 603 is executed therefore between steps 316/315 and step 317.

In a step 6031, the processing module 500 checks a value of the syntax element recommended_decoded_resolution_for_ilf.

If the syntax element recommended_decoded_resolution_for_ilf equals true, the processing module 500 executes a step 6034 during which the in-loop filtering is applied on the reconstructed current picture at the first spatial resolution. The in-loop filtered reconstructed current picture is then stored in the DPB.

In a step 6035, when the in-loop filtered reconstructed current picture is used as a reference picture for temporal prediction, the processing module 500 applies a resampling at a target resolution to the in-loop filtered reconstructed current picture. The target resolution corresponds to the spatial resolution of a picture temporally predicted from the in-loop filtered reconstructed current picture stored in the DPB 319. Step 6035 is applied only if the target resolution is different from the spatial resolution of the in-loop filtered reconstructed current picture. The resampling can be achieved on the entire picture, or only to the samples needed for motion compensation for blocks of the current picture using these samples as reference. In some implementations, the resampling and the motion compensation are applied jointly in one single sample interpolation step.

If recommended_decoded_resolution_for_ilf equals false, in a step 6032, the processing module 500 determines at which spatial resolution or resolutions applying in-loop filtering.

During a step 6033, for each determined spatial resolution different from the first resolution, the processing module 500 resamples the reconstructed current picture at said spatial resolution to obtain a resampled reconstructed current picture. The determined spatial resolutions comprise at least one second spatial resolution different from the first spatial resolution.

In step 6034, at least for each determined second spatial resolution, the processing module applies in-loop filtering to the picture corresponding to said second spatial resolution. Each in-loop filtered picture is then stored in the DPB.

During step 6035, when one of the in-loop filtered pictures generated during step 6034 is used as a reference picture for temporal prediction, the processing module 500 applies a resampling at the target resolution to samples of said in-loop filtered reconstructed current picture. Again, step 6035 is applied only if the target resolution is different from the spatial resolution of the in-loop filtered reconstructed current picture. The resampling can be achieved on the entire picture, or only to the samples needed for motion compensation for blocks of the current picture using these samples as reference. In some implementations, the resampling and the motion compensation are applied jointly in one single sample interpolation step.

In some implementations, it is not necessary to store in the DPB each in-loop filtered picture used as a reference picture for temporal prediction, and the in-loop filter can be applied on the fly after the resampling step, or after the motion compensation step, or after the single sample interpolation step when resampling and motion compensation are achieved jointly into one single sample interpolation step.

As can be seen from the above, when recommended_decoded_resolution_for_ilf equals false, i.e. when the applying of in-loop filter at a second spatial resolution different from the first spatial resolution is allowed, the processing module 500 may generate several in-loop-filtered reconstructed pictures for a same current picture. Each in loop-filtered reconstructed current picture is associated to its own in-loop filter parameters (deblocking filter parameters, SAO parameters, ALF parameters). Consequently, the encoded video stream 311 comprises several sets of in-loop filters parameters so that a decoder can reconstruct exactly the same pictures in its own DPB. Alternatively, instead of storing multiple pictures at different resolutions, one single picture at the decoded resolution can be stored, and the resampling and in-loop filters at various resolutions can be applied on the fly when the picture stored in the DPB is used as reference picture. In implementations where the resampling and motion compensation are combined in one single sample interpolation step, the in-loop filtering is preferably applied after the one single sample interpolation step.

In an example, the syntax element recommended_decoded_resolution_for_ilf corresponds to the syntax element sps_decoded_resolution_recommended_for_ilf_flag. sps_decoded_resolution_recommended_for_ilf_flag is set to "0" when a video sequence is encoded with pictures at a first resolution and pictures at a second resolution and RPR is enabled.

In this case, step 6031 is followed by step 6032.

During step 6032, supposing that the processing module 500 doesn't know at the time of encoding a current picture if this current picture will be used as reference picture by another picture and if it is, what will be the resolution of the picture using the current picture as a reference picture, the current picture could be used as a reference picture potentially at the first or at the second spatial resolution. Consequently, the processing module 500 determines that it needs to apply in-loop filters on the reconstructed current picture at the second resolution but also at the first resolution. To do so the reconstructed current picture is resampled at the second spatial resolution in step 6033. This step can be combined in some implementations with the motion compensation step, into a single sample interpolation step. In step 6034, in-loop filtering is applied on the reconstructed current picture at the first resolution and on the resampled reconstructed current picture at the second resolution. Two pictures are stored in the DPB 319 for the current picture, one corresponding to the in-loop filtered reconstructed current picture at the first spatial resolution and a second corresponding to the in-loop filtered reconstructed current picture at the second spatial resolution. Alternatively, instead of storing multiple pictures at the first and second spatial resolutions, one single picture at the first spatial resolution can be stored, and the resampling and in-loop filters at the second spatial resolution can be applied on the fly when the picture stored in the DPB is used as reference picture for a current picture with resolution equal to the second spatial resolution. In implementations where the resampling and motion compensation are combined in one single sample interpolation step, the in-loop filtering at the second spatial resolution is preferably applied after the one single sample interpolation step. Two sets of in-loop filtering parameters are then obtained and signal in the encoded video stream for the current picture. When a next picture at the first spatial resolution uses the current picture as a reference picture, the in-loop filtered reconstructed current picture at the first spatial resolution stored in the DPB 319 is used. When a next picture at the second spatial resolution uses the current picture as a reference picture, the in-loop filtered reconstructed current picture at the second spatial resolution stored in the DPB 319 is used.

In an embodiment, in order to avoid storing several versions of a same current picture in the DPB, steps 6033 (resampling) and 6034 (in-loop filtering) are executed by the processing module 500 only during an execution of a motion estimation (step 304) and motion compensation (step 305) step in which a block of a next picture refers to a block of the current picture. The step on resampling (6033) and the step of motion compensation can be combined in some implementations into a single sample interpolation step. In this case, step 6034 (in-loop filtering) applies after this single sample interpolation step.

In an embodiment of step 6032, the processing module 500 determines the spatial resolution or resolutions at which is applied in-loop filtering in function of information on the system 53. This information comprises for instance information representative of available computing resources of the system 53, available storage resources of the system 53, a battery energy level of the system 53, a spatial resolution of a display connected or embedded in the system 53, an available bandwidth on the system 53, etc.

In a second embodiment of step 602, an information representative of a recommended resolution for applying in-loop filtering and/or post-filtering is inserted in the in-loop filtering and/or post filtering metadata. For example, the syntax elements filter_hint_recommended_width and filter_hint_recommended_height are inserted in the post_filter_hint SEI message as represented in table TAB6.

TABLE TAB6

```
post_filter_hint( payloadSize ) {
    filter_hint_recommended_width
    filter_hint_recommended_height
    filter_hint_size_y
    filter_hint_size_x
    filter_hint_type
    for( cIdx = 0; cIdx < ( chroma_format_idc = = 0 ? 1 : 3 ); cIdx++ )
        for( cy = 0; cy < filter_hint_size_y; cy ++ )
            for( cx = 0; cx < filter_hint_size_x; cx ++ )
                filter_hint_value[ cIdx ][ cy ][ cx ]
}
``` filter_hint_recommended_width specifies a picture width at which the post-filter is recommended to be applied.

filter_hint_recommended_height specifies a picture height at which the post-filter is recommended to be applied.

If the decoded picture width is not equal to filter_hint_recommended_width or the decoded picture height is not equal to filter_hint_recommended_height, it is recommended to resample the decoded picture to produce a resampled picture of width equal to filter_hint_recommended_width and of height equal to filter_hint_recommended_height before applying post-filtering to said picture.

In a third embodiment of step 602, instead of a recommending one resolution, an information representative of a recommended resolution range for applying in-loop filtering and/or post-filtering is inserted in the in-loop filtering and/or post filtering metadata. For example, the syntax elements filter_hint_recommended_width[ ] and filter_hint_recommended_height[ ] are inserted in the post_filter_hint SEI message as represented in table TAB7.

TABLE TAB7

```
post_filter_hint( payloadSize ) {
    for( rIdx = 0; rIdx < 2; rIdx++ )
        filter_hint_recommended_width[ rIdx ]
        filter_hint_recommended_height[ rIdx ]
    filter_hint_size_y
    filter_hint_size_x
    filter_hint_type
    for( cIdx = 0; cIdx < ( chroma_format_idc == 0 ? 1 : 3 );
cIdx++ )
        for( cy = 0; cy < filter_hint_size_y; cy ++ )
            for( cx = 0; cx < filter_hint_size_x; cx ++ )
                filter_hint_value[ cIdx ][ cy ][ cx ]
}
```

In this third embodiment of step 602, the post-filtering is recommended to be applied to the decoded picture at a resolution characterized by a width greater than or equal to filter_hint_recommended_width[0] and lower than or equal to filter_hint_recommended_width[1] and a height greater than or equal to filter_hint_recommended_height[0] and lower than or equal to filter_hint_recommended_height[1].

In a fourth embodiment of step 602, an information representative of multiple recommended resolutions or resolution ranges and corresponding in-loop filters (represented by in-loop filters parameters) and/or post filters is inserted in the in-loop filtering and/or post filtering metadata. For example, in a first variant of the fourth embodiment of step 602, the syntax elements, filter_hint_number_filters_minus1, filter_hint_recommended_width[ ] and filter_hint_recommended_height[ ] are inserted in the post_filter_hint SEI message as represented in table TAB8.

TABLE TAB8

```
post_filter_hint( payloadSize ) {
    filter_hint_number_filters_minus1
    for( fIdx = 0; fIdx < filter_hint_number_filters_minus1+1;
fIdx++ ) {
        filter_hint_recommended_width[ fIdx ]
        filter_hint_recommended_height[ fIdx ]
        filter_hint_size_y[ fIdx ]
        filter_hint_size_x[ fIdx ]
        filter_hint_type[ fIdx ]
        for( cIdx = 0; cIdx < ( chroma_format_idc == 0 ? 1 : 3 );
cIdx++ )
            for( cy = 0; cy < filter_hint_size_y[ fIdx ]; cy ++ )
                for( cx = 0; cx < filter_hint_size_x[ fIdx ]; cx ++ )
                    filter_hint_value[ fIdx ][ cIdx ][ cy ][ cx ]
    }
}
``` filter_hint_number_filters_minus1 specifies a number of filters signaled in the post_filter_hint SEI message. The number of filters is derived as (filter_hint_number_filters_minus1+1).

filter_hint_recommended_width[fIdx] specifies the picture width at which the post-filter of index fIdx is recommended to be applied.

filter_hint_recommended_height[fIdx] specifies the picture height at which the post-filter of index fIdx is recommended to be applied.

In an embodiment, it is mandatory that filter_hint_recommended_width[fIdx] and filter_hint_recommended_height[fIdx] are signaled in increasing order, for increasing values of fIdx.

In a second variant of the fourth embodiment of step 602, a range of resolutions is defined for each filter fIdx as follows:

for fIdx=0 to filter_hint_number_filters_minus1−1, it is recommended to apply filter fIdx for width and height in the ranges [filter_hint_recommended_width[fIdx], filter_hint_recommended_width[fIdx+1][ and [filter_hint_recommended_height[fIdx], filter_hint_recommended_height[fIdx+1][, respectively.

for fIdx=filter_hint_number_filters_minus1, it is recommended to apply filter fIdx for width and height larger than or equal to filter_hint_recommended_width[fIdx] and [filter_hint_recommended_height[fIdx], respectively.

In a fifth embodiment of step 602, information representative of a quality impact and/or a complexity impact and/or an energy impact, of applying in-loop filtering or post-filtering at a specified spatial resolution or spatial resolution range, is added as in the in-loop filtering and/or post filtering metadata. When several filters are signaled for several resolutions, information representative of the quality impact and/or complexity impact and/or energy impact are signaled for each filter.

For example, syntax elements filter_hint_delta_quality, filter_hint_delta_complexity and filter_hint_delta_energy are inserted in the post_filter_hint SEI message of table TAB8 as represented in table TAB9.

TABLE TAB9

```
post_filter_hint( payloadSize ) {
    filter_hint_number_filters_minus1
    for( fIdx = 0; fIdx < filter_hint_number_filters_minus1+1;
fIdx++ ) {
        filter_hint_recommended_width[ fIdx ]
        filter_hint_recommended_height[ fIdx ]
        filter_hint_delta_quality[ fIdx ]
        filter_hint_delta_complexity[ fIdx ]
        filter_hint_delta_energy[ fIdx ]
        filter_hint_size_y[ fIdx ]
        filter_hint_size_x[ fIdx ]
        filter_hint_type[ fIdx ]
        for( cIdx = 0; cIdx < ( chroma_format_idc == 0 ? 1 : 3 );
cIdx++ )
            for( cy = 0; cy < filter_hint_size_y[ fIdx ]; cy ++ )
                for( cx = 0; cx < filter_hint_size_x[ fIdx ]; cx ++ )
                    filter_hint_value[ fIdx ][ cIdx ][ cy ][ cx ]
    }
}
```

The parameter filter_hint_delta_quality[fIdx] is used to assess the quality metric obtained after applying the filter of index fIdx, named final_quality as a function $f(.)$ of the initial quality metric, named initial_quality before applying the filter, and of the quality variation named delta_quality (or filter_hint_delta_quality in the example above): final_quality=$f$(initial_quality, delta_quality)

Examples of functions $f(.)$ are given below:

Additive function: final_quality=initial_quality+delta_quality.

Multiplicative function: final_quality=initial_quality× delta_quality.

A similar process can be applied for complexity and energy metrics.

In a variant of the fifth embodiment of step 602, when one single filter is signaled, different quality, complexity, energy information are signaled for different picture resolutions.

The syntax elements described in relation to the second, third, fourth and fifth embodiment of step 602 concerns only post-filtering. In a sixth embodiment of step 602, similar syntax elements could be derived for in-loop filtering. For example, a new APS type ILF_RES_APS is defined for transporting syntax elements specifying:
- an information representative of a recommended resolution for applying in-loop filtering,
- an information representative of a recommended range of resolutions for applying in-loop filtering,
- an information representative of multiple recommended resolutions or resolution ranges and corresponding filters, or
- an information representative of a quality impact and/or a complexity impact and/or an energy impact, of applying an in-loop filter at a given resolution.

In addition, a syntax element ilf_res_data is defined. Table TAB10 represents an example of syntax element ilf_res_ data when an APS of type ILF_RES_APS provide an information representative of a recommended resolution for applying in-loop filtering.

TABLE TAB10

```
ilf_res_data( ) {
    ilf_filter_recommended_width
    ilf_filter_recommended_height
}
``` ilf_filter_recommended_width specifies a picture width at which the in-loop filter is recommended to be applied.

ilf_filter_recommended_height specifies a picture height at which the in-loop filter is recommended to be applied.

In the sixth embodiment of step 602, the APS of type ILF_RES_APS addresses all in-loop filters identically. In a variant, an APS could be defined for each in-loop filter separately.

The implementations of the method of FIG. 8 is slightly different for the sixth embodiment, and in particular for step 6032.

For example, when the syntax elements transported by the APS of type ILF_RES_APS specifies a picture width and a picture height at which the in-loop filter is recommended to be applied, in step 6032, the processing module 500 can decide that the reconstructed current picture needs to be resampled if its spatial resolution doesn't correspond to the spatial resolution specified in the APS of type ILF_REC_APS. Said reconstructed current picture is resampled at the recommended resolution in step 6033 and then in-loop filtered at step 6034. Note that the step 6033 can combine in some implementations the resampling step and the motion compensation step into one single sample interpolation step.

When the syntax elements transported by the APS of type ILF_RES_APS specifies a picture width range and a picture height range at which the in-loop filter is recommended to be applied, in step 6032, the processing module 500 can decide that the reconstructed current picture needs to be resampled if its spatial resolution doesn't comply to the spatial resolution range specified in the APS of type ILF_REC_APS. Said reconstructed current picture is resampled at a resolution compliant with recommended resolution range in step 6033 and then in-loop filtered at step 6034.

When the syntax elements transported by the APS of type ILF_RES_APS specifies a plurality of picture widths or picture width ranges and of picture heights or picture height ranges at which the in-loop filter is recommended to be applied, in step 6032, the processing module 500 can decide that the reconstructed current picture needs to be resampled. Said reconstructed current picture is resampled at each recommended resolution or at a plurality of resolutions compliant with each recommended resolution range in step 6033. In-loop filtering is then applied to each resampled reconstructed current picture at step 6034.

Figure 7:
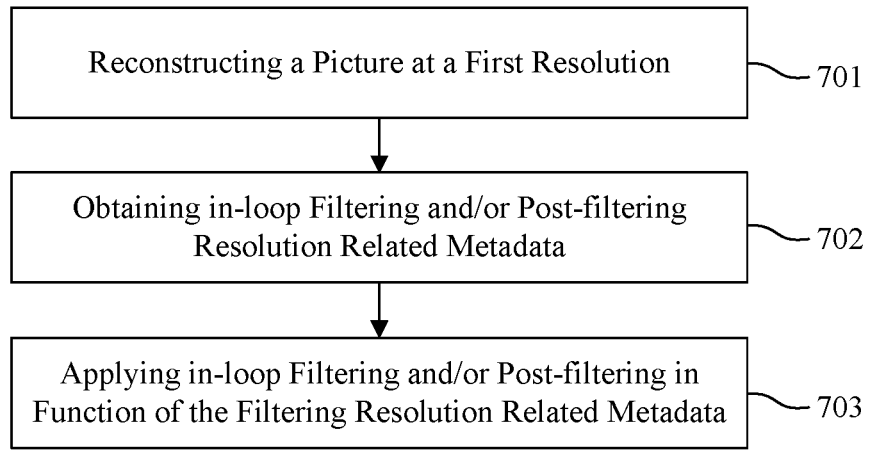

FIG. 7 illustrates schematically an example of method for adapting the spatial resolution of in-loop and post-filtering on a decoder side.

The method described in relation with FIG. 7 is executed by the processing module 500 when this processing module is embedded in the system 53.

In a step 701, the processing module 500 applies steps 410 to 416 to a portion of the encoded video stream 311 and obtains a reconstructed version of said current picture, called reconstructed current picture, at step 317. The reconstructed current picture is reconstructed at a first spatial resolution.

In a step 702, the processing module 500 obtains, from the encoded video stream, metadata, called filtering resolution metadata, representative of an information specifying that applying at least one in-loop filtering and/or at least one post filtering on at least a portion of said reconstructed picture at a second spatial resolution different from the first spatial resolution is allowed.

In a step 703, the processing module applies in-loop filtering and/or post-filtering in function of said filtering resolution metadata.

In a first embodiment of step 702, an information is obtained from the in-loop or post-filter metadata to indicate that the filtering process can be performed at at least one second spatial resolution different from the first spatial resolution, however without specifying any second spatial resolution.

In a first variant of the first embodiment of step 702, the information is the syntax element filter_hint_decoded_resolution_recommended_flag described in relation to the first variant of the first embodiment of step 602.

In a second variant of the first embodiment of step 702, said information is obtained from the syntax element filter_hint_type as described in the second variant of the first embodiment of step 702.

In a third variant of the first embodiment of step 702, said information is obtained from the SEI message adaptive_loop_filter_control proposed in document JVET-R0190 as described in relation to the third variant of the first embodiment of step 602.

In a fourth variant of the first embodiment of step 702, said information is obtained from a SPS from syntax elements sps_decoded_resolution_recommended_for_ilf_flag or sps_decoded_resolution_recommended_for_DBF_flag or sps_decoded_resolution_recommended_for_SAO_flag, sps_decoded_resolution_recommended_for_ALF_flag as described in relation to the fourth variant of the first embodiment of step 602.

Based on the value of at least one of the syntax elements described in relation to the four variants of the first embodiment of step 702, noted below recommended_decoded_resolution for notation simplifications, in step 703 the processing module 500 applies in-loop filtering and/or post-filtering in function of the value of recommended_decoded_resolution.

Figure 9:
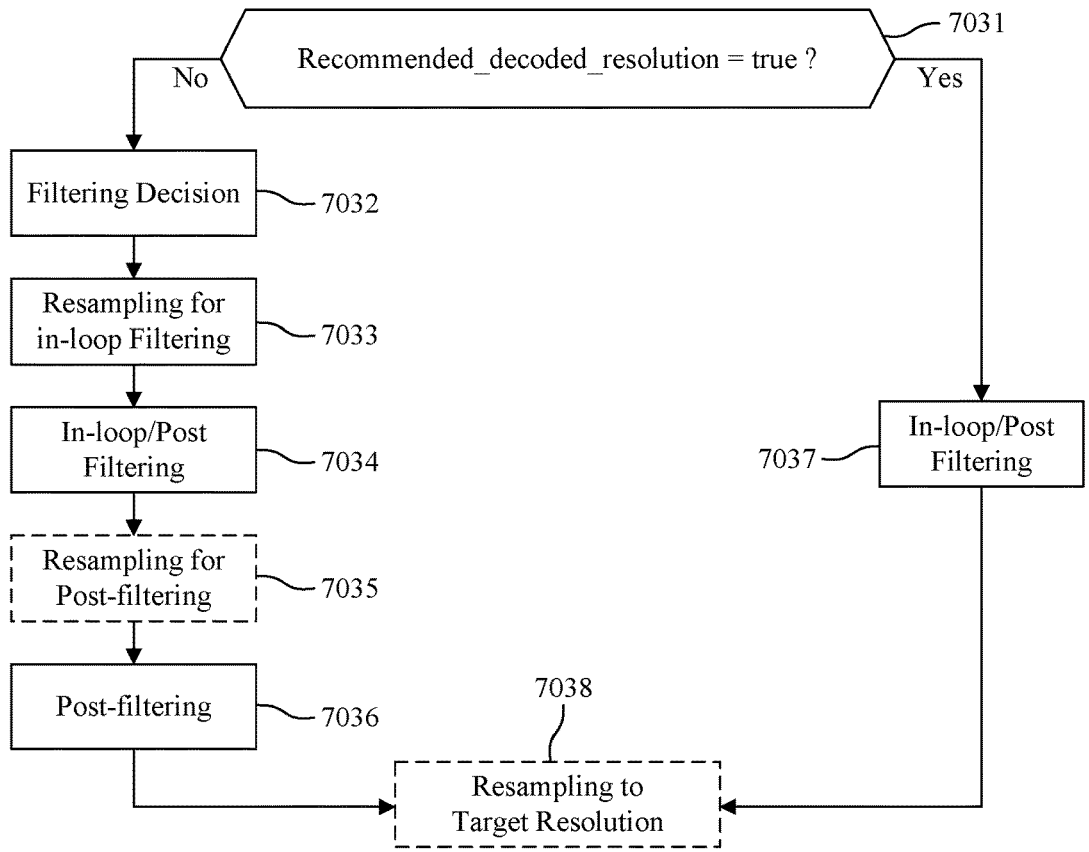
FIG. 9 illustrates schematically a detail of the method of FIG. 7.

FIG. 9 illustrates schematically an example of embodiment of step 703.

In a step 7031, the processing module 500 checks a value of the syntax element recommended_decoded_resolution.

If the syntax element recommended_decoded_resolution equals true, the processing module 500 executes a step 7037 during which the in-loop filtering and post filtering is applied on the reconstructed current picture at the first spatial resolution. The in-loop filtered reconstructed current picture is stored in the DPB. The post filtering is applied on the in-loop filtered reconstructed current picture.

In a step 7038, when the in-loop filtered reconstructed current picture is used as a reference picture for temporal prediction, the processing module 500 applies a resampling at a target resolution to the in-loop filtered reconstructed current picture. The target resolution corresponds to the spatial resolution of a picture temporally predicted from the in-loop filtered reconstructed current picture stored in the DPB 419. Step 7038 is applied only if the target resolution is different from the spatial resolution of the in-loop filtered reconstructed current picture. A resampling to a target resolution could also be applied to the picture resulting from the post-processing of the in-loop filtered reconstructed current picture, for example, if the spatial resolution of said picture doesn't correspond to a resolution accepted by a display.

As can be seen from the above, when recommended_decoded_resolution equals true, the processing module 500 applies the usual decoding process. Step 7037 corresponds to step 417 and 421 in FIG. 4.

If recommended_decoded_resolution equals false, in a step 7032, the processing module 500 determines at which spatial resolution or resolutions applying in-loop filtering and post-filtering. The determined spatial resolutions comprise at least one second spatial resolution different from the first spatial resolution.

During a step 7033, for each second spatial resolution determined for in-loop filtering, the processing module 500 resamples the reconstructed current picture at said second spatial resolution to obtain a resampled reconstructed current picture. The resampling can be achieved on the entire picture, or only to the samples needed for motion compensation for blocks of the current picture using these samples as reference. In some implementations, the resampling and the motion compensation are applied jointly in one single sample interpolation step.

In step 7034, at least for each second spatial resolution determined for in-loop filtering, the processing module applies in-loop filtering to the picture corresponding to said second spatial resolution using in-loop parameters signaled in the encoded video stream 311. Each in-loop filtered picture is then stored in the DPB 419. In-loop filtered reconstructed current pictures stored in the DPB 419 for the current picture are identical to the in-loop filtered reconstructed current pictures stored in the DPB 319 for the same current picture. In some implementations, it is not necessary to store in the DPB each in-loop filtered picture used as a reference picture for temporal prediction, and the in-loop filter can be applied on the fly after the resampling step, or after the motion compensation step, or after the single sample interpolation step when resampling and motion compensation are achieved jointly into one single sample interpolation step.

In a step 7035, if none of the in-loop filtered reconstructed current pictures generated during step 7034 has a spatial resolution corresponding to a second spatial resolution determined for applying the post-filtering in step 7032, in a step 7035, a resampling to said second spatial resolution is applied to one of the post filtered reconstructed current picture. For example, the resampling is applied to the post filtered reconstructed current picture having the spatial resolution the closest to the second spatial resolution determined for applying post-filtering.

In a step 7036, post-filtering is applied to one of the in-loop filtered reconstructed current picture generated in step 7034 if one of these pictures has a spatial resolution corresponding to the second spatial resolution determined for applying post-filtering or, otherwise to the picture generated in step 7035.

During step 7038, if necessary, a resampling may be applied to either one of the in-loop filtered reconstructed current picture resulting from step 7034 or to the post-filtered picture resulting from step 7036. Resampling of an in-loop filtered reconstructed current picture could be necessary if the current picture is used as a reference picture for temporal prediction of a next picture but none of the in-loop filtered reconstructed current picture stored in the DPB 419 has a spatial resolution corresponding to the spatial resolution of the next picture. Resampling of the post-filtered picture could be necessary if, for example, the spatial resolution of said post-filtered picture doesn't correspond to a resolution allowed by the display.

As can be seen from the above, when recommended_decoded_resolution equals false, steps 7032, 7033 and 7034 replace step 417 and steps 7035 and 7036 replace step 421.

In an example, the syntax element recommended_decoded_resolution specifies that applying in-loop filtering and post filtering on a reconstructed picture at a second resolution different from the first resolution is allowed for all in-loop filtering tools and post-filtering tools. In addition, for simplicity, all pictures encoded using temporal prediction in the encoded video sequence 311 are P pictures temporally predicted only from the immediately preceding picture in display order. Moreover, every second image is encoded at a first spatial resolution and the others are encoded at a second spatial resolution, the second spatial resolution being larger than the first spatial resolution. Finally, it is supposed that the decoder knows the above characteristics of the encoded video sequence 311. Consequently, when decoding a current picture of the encoded video sequence 311, the decoder (i.e. the processing module 500 implementing the decoder), knows exactly the spatial resolution of the picture using this current picture as a reference picture for temporal prediction.

In this case, step 7031 is followed by step 7032.

During step 7032, the processing module 500 knows that the spatial resolution of the reconstructed current picture is different from the spatial resolution of the next picture predicted from the reconstructed current picture. If the reconstructed current picture is at the first spatial resolution, the processing module 500 determines that the reconstructed current picture needs to be up-sampled to the second spatial resolution for in-loop filtering. If the reconstructed current picture is at the second spatial resolution, the processing module 500 determines that the reconstructed current picture needs to be down-sampled to the first spatial resolution for in-loop filtering.

In step 7033, the reconstructed current picture is resampled in function of the resampling spatial resolution determined in step 7032.

In step 7034, all in-loop filters are applied on the resampled reconstructed current picture. The obtained in-loop filtered reconstructed current picture is then stored in the DPB 419.

For steps 7035 and 7036, we suppose that the processing module 500 knows that post filtering is always applied at the second spatial resolution. Consequently, up-sampling is applied in step 7035 only when the in-loop filtered reconstructed current picture is at the first resolution.

In step 7036, the processing module 500 post-filters the in-loop filtered reconstructed current picture at the second spatial resolution.

In an embodiment of step 7032, the processing module 500 determines the spatial resolution or resolutions at which is applied in-loop filtering and post-filtering in function of information on the system 53. This information comprises for instance information representative of available computing resources of the system 53, available storage resources of the system 53, a battery energy level of the system 53, a spatial resolution of a display connected or embedded in the system 53, an available bandwidth on the system 53, etc.

In a second embodiment of step 702, an information representative of a recommended resolution for applying in-loop filtering and/or post-filtering embedded the in-loop filtering and/or post filtering metadata is obtained by the processing module 500. Said information comprises the syntax elements filter_hint_recommended_width and filter_hint_recommended_height as described in relation to the second embodiment of step 602.

In a third embodiment of step 702, instead of one recommended resolution, the processing module obtains an information representative of a recommended resolution range for applying in-loop filtering and/or post-filtering from the in-loop filtering and/or post filtering metadata. Said information comprises the syntax elements filter_hint_recommended_width[ ] and filter_hint_recommended_height[ ] as described in the third embodiment of step 602.

In a fourth embodiment of step 702, the processing module obtains an information representative of multiple recommended resolutions or resolution ranges and corresponding filters from the in-loop filtering and/or post filtering metadata. For example, in a first variant of the fourth embodiment of step 702, said information comprises the syntax elements, filter_hint_number_filters_minus1, filter_hint_recommended_width[ ] and filter_hint_recommended_height[ ] as described in relation to the fourth embodiment of step 602.

In a second variant of the fourth embodiment of step 702, the processing module 500 obtains a range of resolutions for each filter fIdx as described in relation to the second variant of the fourth embodiment of step 602.

In a fifth embodiment of step 702, the processing module 500 obtains an information representative of a quality impact and/or a complexity impact and/or an energy impact, of applying a filter, from the in-loop filtering and/or post filtering metadata. Said information comprises the syntax elements filter_hint_delta_quality, filter_hint_delta_complexity and filter_hint_delta_energy as described in the fifth embodiment of step 602.

In a sixth embodiment of step 702, the processing module 500 obtains information specifying:

an information representative of a recommended resolution for applying in-loop filtering;
an information representative of a recommended range of resolutions for applying in-loop filtering;
an information representative of multiple recommended resolutions or resolution ranges and corresponding filters; or,
an information representative of a quality impact and/or a complexity impact and/or an energy impact, of applying an in-loop filter at a given resolution.similar syntax elements could be derived for in-loop filtering;
corresponding to the information described in relation to the sixth embodiment of step 702.

Similarly to step 603 that is adapted to the various embodiments of step 602, the implementation of step 703, described in relation to FIG. 9, is adapted to the various embodiments of step 702. In particular, in step 7032, the processing module 500 takes into account the information representative of the spatial resolution recommended for in-loop filtering and/or post-filtering obtained in step 702 to possibly decide to resample a reconstructed current picture at, at least, one second spatial resolutions for in-loop filtering and/or post-filtering. The resampling can be achieved on the entire picture, or only to the samples needed for motion compensation for blocks of the current picture using these samples as reference. In some implementations, the resampling and the motion compensation are applied jointly in one single sample interpolation step.

In some implementations, it is not necessary to store in the DPB each in-loop filtered picture used as a reference picture for temporal prediction, and the in-loop filter can be applied on the fly after the resampling step, or after the motion compensation step, or after the single sample interpolation step when resampling and motion compensation are achieved jointly into one single sample interpolation step.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs at least one of the embodiments described.

A TV, set-top box, cell phone, tablet, or other electronic device that performs at least one of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded video stream, and performs at least one of the embodiments described.

A TV, set-top box, cell phone, tablet, or other electronic device that receives (e.g. using an antenna) a signal over the air that includes an encoded video stream, and performs at least one of the embodiments described.

The invention claimed is:

1. A method for video encoding pictures comprising:
applying a video compression method based on a prediction loop comprising reconstructing a picture at a first spatial resolution, the video compression method comprising an in-loop filtering, a post-filtering, or a combination thereof, the in-loop filtering being at least one of a deblocking filtering, sample adaptive offset, or adaptive loop filtering, and the post-filtering being applied on a picture outside of the prediction loop after a reconstruction of the picture; and signaling, with the picture, metadata indicating with a first value, that it is allowed to apply the in-loop filtering, the post-filtering, or the combination thereof on picture data resulting from a resampling of the reconstructed picture at a second spatial resolution different from the first spatial resolution, and with a second value, that it is recommended to apply the in-loop filtering, the post-filtering, or the combination thereof on picture data of the reconstructed picture at the first spatial resolution.

2. The method of claim 1, wherein, responsive to the first value is indicated, the metadata further specify at least one spatial resolution at which an application of the in-loop filtering, the post-filtering, or the combination thereof on the picture data is recommended.

3. The method of claim 1, wherein, responsive to the first value is indicated, the metadata further specify at least one spatial resolution range at which an application of the in-loop filtering, the post-filtering, or the combination thereof on the picture data is recommended.

4. The method of claim 2, wherein, when the metadata specify a plurality of spatial resolutions, the metadata further specify an in-loop filter, a post-filter, or a combination thereof corresponding to each spatial resolution of at least a subset of the plurality of spatial resolutions.

5. The method of claim 3, wherein the metadata further specify for each spatial resolution for which an in-loop filter, a post-filter, or a combination thereof is specified, information representative of at least one among a quality impact, a complexity impact, or an energy impact, of applying in-loop filtering, post-filtering, or a combination thereof at the specified spatial resolution.

6. A device for video encoding pictures comprising electronic circuitry adapted for:
applying a video compression method based on a prediction loop comprising reconstructing a picture at a first spatial resolution, the video compression method comprising an in-loop filtering, a post-filtering, or a combination thereof, the in-loop filtering being at least one of a deblocking filtering, sample adaptive offset, or adaptive loop filtering, and the post-filtering being applied on a picture outside of the prediction loop after a reconstruction of the picture; and signaling, with the picture, metadata indicating with a first value, that it is allowed to apply the in-loop filtering, the post-filtering, or the combination thereof on picture data resulting from a resampling of the reconstructed picture at a second spatial resolution different from the first spatial resolution, and with a second value, that it is recommended to apply the in-loop filtering, the post-filtering, or the combination thereof on picture data of the reconstructed picture at the first spatial resolution.

7. The device of claim 6, wherein, responsive to the first value is indicated, the metadata further specify at least one spatial resolution at which an application of the in-loop filtering, the post-filtering, or the combination thereof on the picture data is recommended.

8. The device of claim 6, wherein, responsive to the first value is indicated, the metadata further specify at least one spatial resolution range at which an application of the in-loop filtering, the post-filtering, or the combination thereof on the picture data is recommended.

9. The device of claim 7, wherein, when the metadata specify a plurality of spatial resolutions, the metadata further specify an in-loop filter, a post-filter, or a combination thereof corresponding to each spatial resolution of at least a subset of the plurality of spatial resolutions.

10. The device of claim 9, wherein the metadata further specify for each spatial resolution for which an in-loop filter, a post-filter, or a combination thereof is specified, information representative of at least one among a quality impact, a complexity impact, or an energy impact, of applying in-loop filtering, post-filtering, or a combination thereof at the specified spatial resolution.

11. A method for video decoding pictures comprising:
obtaining a reconstructed picture at a first spatial resolution applying a reconstruction method based on a prediction loop, the reconstruction method comprising an in-loop filtering, a post-filtering, or a combination thereof, the in-loop filtering being at least one of a deblocking filtering, sample adaptive offset, or adaptive loop filtering, and the post-filtering being applied on a picture outside of the prediction loop after a reconstruction of the picture; and obtaining metadata associated with the picture indicating with a first value, that it is allowed to apply the in-loop filtering, the post-filtering, or the combination thereof on picture data resulting from a resampling of the reconstructed picture at a second spatial resolution different from the first spatial resolution, and with a second value, that it is recommended to apply the in-loop filtering, the post-filtering, or the combination thereof on picture data of the reconstructed picture at the first spatial resolution.

12. The method of claim 11, wherein, responsive to the first value is indicated, the metadata further specify at least one spatial resolution at which an application of the in-loop filtering, the post-filtering, or the combination thereof on the picture data is recommended.

13. The method of claim 11, wherein, responsive to the first value is indicated, the metadata further specify at least one spatial resolution range at which an application of the in-loop filtering, the post-filtering, or the combination thereof on the picture data is recommended.

14. The method of claim 12, wherein, when the metadata specify a plurality of spatial resolutions, the metadata further specify an in-loop filter, a post-filter, or a combination thereof corresponding to each spatial resolution of at least a subset of the plurality of spatial resolutions.

15. The method of claim 14, wherein the metadata further specify for each spatial resolution for which an in-loop filter, a post-filter, or a combination thereof is specified, information representative of at least one among a quality impact, a complexity impact, or an energy impact, of applying in-loop filtering, post-filtering, or a combination thereof at the specified spatial resolution.

16. A device for video decoding pictures comprising electronic circuitry adapted for:
obtaining a reconstructed picture at a first spatial resolution applying a reconstruction method based on a prediction loop, the reconstruction method comprising an in-loop filtering, a post-filtering, or a combination thereof, the in-loop filtering being at least one of a deblocking filtering, sample adaptive offset, or adaptive loop filtering, and the post-filtering being applied on a picture outside of the prediction loop after a reconstruction of the picture; and obtaining metadata associated with the picture indicating with a first value, that it is allowed to apply the in-loop filtering, the post-filtering, or the combination thereof on picture data resulting from a resampling of the reconstructed picture at a second spatial resolution different from the first spatial resolution, and with a second value that it is recommended to apply the in-loop filtering, the post-filtering, or the combination thereof on picture data of the reconstructed picture at the first spatial resolution.

17. The device of claim 16, wherein, responsive to the first value is indicated, the metadata further specify at least one spatial resolution at which an application of the in-loop filtering, the post-filtering, or the combination thereof on the picture data is recommended.

18. The device of claim 16, wherein, responsive to the first value is indicated, the metadata further specify at least one spatial resolution range at which an application of the in-loop filtering, the post-filtering, or the combination thereof on the picture data is recommended.

19. The device of claim 17, wherein, when the metadata specify a plurality of spatial resolutions, the metadata further specify an in-loop filter, a post-filter, or a combination thereof corresponding to each spatial resolution of at least a subset of the plurality of spatial resolutions.

20. The device of claim 19, wherein the metadata further specify for each spatial resolution for which an in-loop filter, a post-filter, or a combination thereof is specified, information representative of at least one among a quality impact, a complexity impact, or an energy impact, of applying in-loop filtering, post-filtering, or a combination thereof at the specified spatial resolution.

* * * * *